US011487942B1

(12) United States Patent
Senthivel et al.

(10) Patent No.: US 11,487,942 B1
(45) Date of Patent: Nov. 1, 2022

(54) SERVICE ARCHITECTURE FOR ENTITY AND RELATIONSHIP DETECTION IN UNSTRUCTURED TEXT

(71) Applicant: Amazon Technologies, Inc., Seattle, WA (US)

(72) Inventors: Thiruvarul Selvan Senthivel, Snoqualmie, WA (US); Varun Sembium Varadarajan, Bothell, WA (US); Borui Zhang, Seattle, WA (US); Tiberiu Mircea Doman, Kirkland, WA (US); Parminder Bhatia, Seattle, WA (US); Arun Kumar Ravi, Kirkland, WA (US); Mohammed Khalilia, Seattle, WA (US); Emine Busra Celikkaya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 507 days.

(21) Appl. No.: 16/437,338

(22) Filed: Jun. 11, 2019

(51) Int. Cl.
*G06F 16/93* (2019.01)
*G06F 40/30* (2020.01)
(Continued)

(52) U.S. Cl.
CPC .......... *G06F 40/295* (2020.01); *G06F 16/288* (2019.01); *G06F 16/31* (2019.01);
(Continued)

(58) Field of Classification Search
CPC .... G06F 40/30; G06F 16/3344; G06F 40/279; G06F 40/284; G06F 40/295;
(Continued)

(56) References Cited

U.S. PATENT DOCUMENTS 9,996,670 B2 * 6/2018 Dejori .................... G16H 50/70
10,607,042 B1 * 3/2020 Dasgupta ................ G06F 40/30
(Continued)

OTHER PUBLICATIONS

Magge et al, "Clinical NER and relation extraction using bi-char-LSTMs and random forest classifiers", May 2018, In International Workshop on Medication and Adverse Drug Event Detection May 16, 2018 (pp. 25-30). PMLR.*
(Continued)

*Primary Examiner* — Olujimi A Adesanya
(74) *Attorney, Agent, or Firm* — Nicholson De Vos Webster & Elliott LLP

(57) ABSTRACT

Techniques for entity and relationship detect from unstructured text as a service are described. A service may receive a request to identify entities within a provided unstructured text element, and the service may segment and tokenize the unstructured text and send the result to multiple services implementing multiple deep machine learning models trained to identify particular entities. The service may send additional requests to an additional service or services implementing additional deep machine learning models to identify relationships between detected attributes and ones of the detected entities. The outputs from all services can be analyzed and consolidated into a single result that identifies the entities, any attributes of the entities, and confidence scores indicating the confidence in each detected entity.

20 Claims, 11 Drawing Sheets

(51) Int. Cl.
  *G06F 40/295* (2020.01)
  *G06F 16/28* (2019.01)
  *G06F 16/31* (2019.01)
  *G06N 3/04* (2006.01)
  *G06N 3/08* (2006.01)
  *G06F 40/284* (2020.01)

(52) U.S. Cl.
  CPC ......... *G06F 40/284* (2020.01); *G06N 3/0454* (2013.01); *G06N 3/08* (2013.01); *G06N 3/04* (2013.01); *G06N 3/0445* (2013.01)

(58) Field of Classification Search
  CPC .... G06F 40/205; G06N 3/0445; G06N 5/022; G06N 20/00; G06N 5/04; G06N 3/0427; G06N 3/08; G06N 20/20; G06N 3/04
  See application file for complete search history.

(56) References Cited

U.S. PATENT DOCUMENTS

| | | | |
|---|---|---|---|
| 10,740,561 B1* | 8/2020 | Cao | G06F 40/284 |
| 10,770,180 B1* | 9/2020 | Kemp | G06N 3/0445 |
| 2011/0246462 A1* | 10/2011 | Wu | G06F 16/958 |
| | | | 707/736 |
| 2012/0215559 A1* | 8/2012 | Flanagan | G16H 15/00 |
| | | | 705/3 |
| 2012/0278102 A1* | 11/2012 | Johnson | G16H 10/60 |
| | | | 705/3 |
| 2015/0324454 A1* | 11/2015 | Roberts | G06F 16/334 |
| | | | 707/734 |
| 2016/0048655 A1* | 2/2016 | Maitra | G16H 20/10 |
| | | | 705/3 |
| 2016/0140210 A1* | 5/2016 | Pendyala | G06Q 50/18 |
| | | | 707/737 |
| 2016/0148116 A1 | 5/2016 | Bornea et al. | |
| 2017/0075904 A1* | 3/2017 | Hedges | G06F 16/367 |
| 2017/0372220 A1* | 12/2017 | Krishnamurthy | G06N 7/005 |
| 2018/0075012 A1* | 3/2018 | Allen | G16H 10/60 |
| 2018/0082183 A1* | 3/2018 | Hertz | G06Q 10/10 |
| 2018/0089383 A1* | 3/2018 | Allen | G16H 50/20 |
| 2018/0293227 A1* | 10/2018 | Guo | G06F 40/205 |
| 2019/0163875 A1* | 5/2019 | Allen | G16H 10/60 |
| 2019/0354544 A1 | 11/2019 | Hertz et al. | |
| 2020/0090033 A1* | 3/2020 | Ramachandran | G06N 3/08 |
| 2020/0134422 A1* | 4/2020 | Gliozzo | G06N 3/0454 |
| 2020/0210867 A1* | 7/2020 | Banis | G06N 5/003 |
| 2020/0218744 A1* | 7/2020 | Wang | G06K 9/6228 |
| 2021/0081717 A1* | 3/2021 | Creed | G06N 5/022 |
| 2021/0200951 A1* | 7/2021 | Gao | G06F 40/205 |

OTHER PUBLICATIONS

Verga et al, "Attending to all mention pairs for full abstract biological relation extraction", Oct. 2017, arXiv preprint arXiv:1710.08312. Oct. 23, 2017.*

Vaswani et al, "Attention is all you need", 2017, InAdvances in neural information processing systems 2017 (pp. 5998-6008).*

Jagannatha et al, "Structured prediction models for RNN based sequence labeling in clinical text", 2016,InProceedings of the conference on empirical methods in natural language processing. conference on empirical methods in natural language processing Nov. 2016 (vol. 2016, p. 856). NIH Public Access.*

Zheng et al, "Joint entity and relation extraction based on a hybrid neural network", 2017, In Neurocomputing. Sep. 27, 2017;257:59-66.*

Mandya et al, Combining long short term memory and convolutional neural network for cross-sentence n-ary relation extraction:, Nov. 2018, arXiv preprint arXiv:1811.00845. Nov. 2018 , pp. 1-9.*

Rumeng et al, "A hybrid neural network model for joint prediction of presence and period assertions of medical events in clinical notes", 2017, InAMIA Annual Symposium Proceedings 2017 (vol. 2017, p. 1149-1158). American Medical Informatics Association.*

Liu et al, "AZDrugMiner: an information extraction system for mining patient-reported adverse drug events in online patient forums", 2013, InInternational conference on smart health Aug. 3, 2013 (pp. 134-150). Springer, Berlin, Heidelberg.*

Liang et al, "A novel approach towards medical entity recognition in Chinese clinical text", Jul. 2017, Journal of Healthcare Engineering. Jul. 5, 2017;201, pp. 1-17.*

Bhatia et al, "Joint entity extraction and assertion detection for clinical text", Dec. 2018, arXiv preprint arXiv:1812.05270. Dec. 13, 2018, pp. 1-6.*

Bhatia et al, "End-to-end joint entity extraction and negation detection for clinical text", Jan. 2019, InInternational Workshop on Health Intelligence Jan. 27, 2019 (pp. 139-148). Springer, Cham.*

CMS.gov, "ICD-10", Centers for Medicare & Medicaid Services, Available Online at <https://www.cms.gov/Medicare/Coding/ICD10?redirect=/ICD10>, Oct. 1, 2015, pp. 1-2.

CMS.gov, "ICD-10-CM Official Guidelines for Coding and Reporting", Available Online at <http://www.cms.gov/Medicare/Coding/ICD10/downloads/7_Guidelines10cm2010.pdf>, 2010, pp. 1-98.

Devlin et al., "BERT: Pre-training of Deep Bidirectional Transformers for Language Understanding", arXiv:1810.04805v2, May 24, 2019, 16 pages.

U.S. National Library of Medicine, "RxNorm", Available Online at <https://www.nlm.nih.gov/research/umls/rxnorm/index.html>, Unified Medical Language System (UMLS), U.S. Department of Health & Human Services, Dec. 16, 2019, 1 page.

U.S. National Library of Medicine, "Unified Medical Language System (UMLS)", U.S. Department of Helath & Human Services, Available Online at <https://www.nlm.nih.gov/research/umls/index.html>, May 23, 2019, pp. 1-2.

Bhatia, Parminder et al.; "Comprehend Medical: a Named Entity Recognition and Relationship Extraction Web Service"; downloaded from https://arxiv.org/pdf/1910.07419.pdf on Jan. 3, 2020, 8 pages.

Non-Final Office Action, U.S. Appl. No. 16/714,243, dated May 24, 2022, 26 pages.

Notice of Allowance, U.S. Appl. No. 16/714,243, dated Sep. 19, 2022, 10 pages.

* cited by examiner

```
{
    "ENTITIES": [
        {
            "ID": 1,
            "BEGINOFFSET": 7,
            "ENDOFFSET": 22,
            "SCORE": 0.9998517036437988,
            "TEXT": "SODIUM CHLORIDE",
            "CATEGORY": "MEDICATION",
            "TYPE": "GENERIC_NAME",
            "TRAITS": [],
            "ATTRIBUTES": [
                {
                    "TYPE": "ROUTE_OR_MODE",
                    "SCORE": 0.32359644770622253,
                    "RELATIONSHIPSCORE": 0.9719992280006409,
                    "ID": 0,
                    "BEGINOFFSET": 0,
                    "ENDOFFSET": 6,
                    "TEXT": "INFUSE",
                    "TRAITS": []
                },
...
                {
                    "TYPE": "DURATION",
                    "SCORE": 0.9392423033714294,
                    "RELATIONSHIPSCORE": 0.9961885809898376,
                    "ID": 8,
                    "BEGINOFFSET": 91,
                    "ENDOFFSET": 97,
                    "TEXT": "3 DAYS",
                    "TRAITS": []
                }
            ]
        }
    ],
    "UNMAPPEDATTRIBUTES": [
        {
            "TYPE": "MEDICATION",
            "ATTRIBUTE": {
                "TYPE": "DOSAGE",
                "SCORE": 0.9922149777412415,
                "ID": 4,
                "BEGINOFFSET": 37,
                "ENDOFFSET": 44,
                "TEXT": "1000 ML",
                "TRAITS": []
            }
        },
        {
            "TYPE": "MEDICATION",
            "ATTRIBUTE": {
                "TYPE": "RATE",
                "SCORE": 0.9728594422340393,
                "ID": 7,
                "BEGINOFFSET": 72,
                "ENDOFFSET": 81,
                "TEXT": "200 ML/HR",
                "TRAITS": []
            }
        }
    ]
}
```

(ABBREVIATED) RESULT 300

FIG. 3

RESULT USER INTERFACE 400

Pt is 40yo mother, highschool teacher
 • Age (40yo)    • Profession (highschool teacher)

[Symptom]
HPI: Sleeping trouble on present dosage of Clonidine.
 • Dx name (Sleeping trouble)    • Generic name (Clonidine)

[Symptom]                                                [Symptom]
Severe Rash on  face and    leg, slightly   itchy
 • Dx name (Rash)  • System organ site (face)  • System organ site (leg)  • Dx name (itchy)

Meds: Vyvanse   50 mgs   po   at breakfast daily,
 • Brand name (Vyvanse)  • Dosage (50 mgs)  • Route or mode (po)  • Frequency (at breakfast daily)

Clonidine   0.2 mgs --   1 and 1/2 tabs   po   qhs
 • Generic name (Clonidine)  • Strength (0.2 mgs)  • Dosage (1 and 1/2 tabs)  • Route or mode (po)  • Frequency (qhs)

[Sign]                          [Negation, Sign]
HEENT: Boggy inferior turbinates, No oropharyngeal lesion
 • System organ site (HEENT)  • Dx name (Boggy inferior turbinates)  • Dx name (oropharyngeal lesion)

RESULT USER INTERFACE 410

| Entity | Type | Category | Traits |
|---|---|---|---|
| 40yo<br>0.99+ score | Age | Protected health information | - |
| highschool teacher<br>0.99 score | Profession | Protected health information | - |
| Sleeping trouble<br>0.80 score | Dx name | Medical condition | Symptom<br>0.67 score |
| Clonidine<br>0.99+ score | Generic name | Medication | - |
| Rash<br>0.99+ score | Dx name | Medical condition | Symptom<br>0.74 score |

FIG. 4

SERVICE ARCHITECTURE FOR ENTITY AND RELATIONSHIP DETECTION IN UNSTRUCTURED TEXT

BACKGROUND

As the amount of data generated and utilized in modern computing continues to expand, a relatively new problem has arisen regarding how to effectively manage and utilize the sheer volume of data. As one example, many organizations have large amounts of unstructured alphanumeric data including textual notes or summaries. While such data is easily utilized and understood by human readers, it is incredibly difficult if not impossible for computing applications to be able to use data in this format, which may be disorganized or organized according to different people's preferences, include different word spellings or acronyms across different users, include varying amounts of detail, etc.

For example, business intelligence type applications are typically designed to provide specific analytics, and thus require a specific data schema or arrangement of data to operate upon. Thus, these applications are not able to utilize the various types of data provided by unstructured data, as unstructured data cannot provide any explicit data structure and instead may or may not provide dimensions or identification attributes, such as tags or metadata that may describe the unstructured data. Further, in the rare case that some business's unstructured data conforms to an explicit structure, it typically will not be compatible with existing business applications. As unstructured data typically does not provide a schema or other data descriptor that may be interpreted by current applications, these applications will fail to extract any base data on which analytics can be run. Finally, as unstructured data is often in different formats and structures—even within a same service area, market, type and/or content—current applications are thus unable to make assumptions about data. As a result, attempts to automate the use of current business intelligence systems on various unstructured data sources have failed.

Some methods have been developed to attempt to bring unstructured data into existing business intelligence type applications, such as via manual tagging. However, manually tagging unstructured data by human taggers to provide a well-defined structure is completely impractical in most systems having large amounts of data, and furthermore manual processes typically produce significant numbers of errors. Thus, manual tagging fails to scale as the amount of unstructured data grows, resulting in a significant number of errors being introduced into the data. Further, although some attempts have been made to create automated tagging software, these systems similarly tend to introduce many errors and typically only work for specific use cases.

BRIEF DESCRIPTION OF DRAWINGS

Various embodiments in accordance with the present disclosure will be described with reference to the drawings, in which:

FIG. 3 is a diagram illustrating an example result including detected entities and relationships according to some embodiments.

FIG. 4 is a diagram including an illustration of detected entities and relationships from an unstructured medical text along with an exemplary graphical user interface for presenting the detected entities and relationships according to some embodiments.

DETAILED DESCRIPTION

Figure 1:
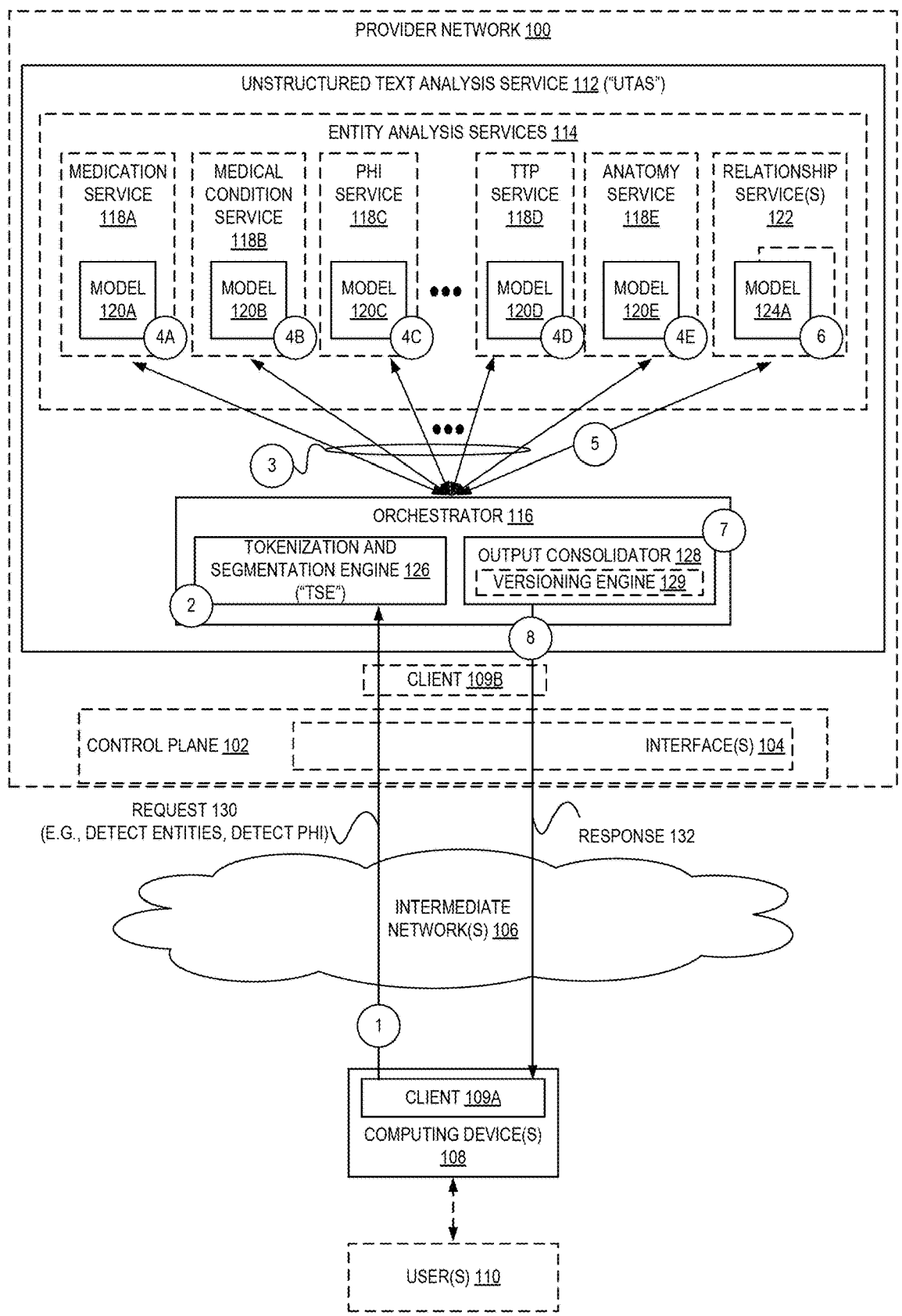
FIG. 1 is a diagram illustrating an environment for synchronous entity and relationship detection from unstructured text according to some embodiments.

Various embodiments of methods, apparatus, systems, and non-transitory computer-readable storage media for entity and relationship detection from unstructured text are described. According to some embodiments, a service for entity and relationship detection is disclosed that upon a user's request can quickly and accurately identify various types of entities and relationships from unstructured text. The service receives unstructured data (e.g., unstructured text) from a client associated with the user, segments the unstructured data input and identifies tokens in these segments, and provides the segmented data and token information to be used with different machine learning (ML) models trained to detect different entity types within the segments. The output from ones of the models may be sent to one or more other models trained to identify relationships between detected classes of objects, such as attributes and entities. The outputs may then be consolidated and returned to the client in a unified response. In some example embodiments, the service may implement various ML models trained to detect medical-related entities from unstructured text (such as doctors' notes). Clients may call the service to request the identification of any entities that can be found, or just specific entities.

As indicated above, many organizations have large amounts of useful data stored in plaintext formats, which makes it extremely difficult to use at large scale in programmatic ways—e.g., for performing analytics. This challenge is particularly relevant in the medical field, in which there exists huge amounts of medical information—ranging from textual descriptions of symptoms, patient history, treatment plans, etc.—represented in data within plaintext fields. There remains a very strong interest in analyzing this extensive medical information to advance the field, whether for detecting optimal treatment patterns, identifying shared but unknown causes of ailments, eliminating administrative burdens, and for countless other possibilities. For example, if various notes regarding clinical trials are made in plaintext form, and a researcher seeks to identify patients who had a particular disease and took a particular medication, typically the researcher (and/or assisting workers) must examine the doctors' notes one by one and/or use search tools in complex ways, such as via crafting queries broadly enough to cover alternative spellings, abbreviations, etc., for the terms of interest, and trying to craft complex but flexible queries to search for different types of information in close proximity with other types of information, e.g., "daily" and "aspirin" and "heart attack" or "stroke" and "male" and "age 70" within some "close" amount of proximity to each other. However, this remains exceedingly difficult—for medical or administrative workers without advanced experience in information retrieval, and even for those well-versed in the field—due to the huge amount of data involved and lack of standardization in the formats of data present in these fields.

Accordingly, embodiments described herein provide a service that can be utilized in a simple and straightforward manner by clients to automatically identify entities—such as types of medications, treatments, medical conditions, etc.—and optionally, relationships involving these entities with other detected classes of objects such as attributes or traits—from unstructured text.

As used herein, unstructured data (or unstructured information) may refer to information that either does not have a pre-defined data model or is not organized in a pre-defined manner Thus, the term unstructured text may refer to alphanumeric type unstructured data such as one or more sentences, one or more sentence fragments, one or more paragraphs, etc. Such unstructured text is often generated or originated by humans, e.g., doctors or nurses may write notes regarding a patient, a salesperson may write notes regarding a sales lead, a student may write an essay, a lawyer may draft a contract, a transcript may be taken of a court proceeding or television broadcast, a businessperson may generate a vendor agreement, etc.

For further detail, FIG. 1 is a diagram illustrating an environment for synchronous entity and relationship detection from unstructured text according to some embodiments. In this exemplary environment, an unstructured text analysis service 112 (or "UTAS") includes an orchestrator 116 that receives requests 130 to detect entities within unstructured text and implements a "scatter" approach to processing utilizing multiple ML models 120/124 (of a set of one or more entity analysis services 114) trained to detect particular entities and/or relationships between types of detected objects. The outputs of these models can be used to generate a consolidated result provided as a response 132 to the request 130 that identifies the various entities and optionally relationships between the entities and other detected objects from within the provided unstructured text.

In some embodiments, the UTAS 112 can operate to detect useful medical-related information in unstructured text such as clinical text. As much as 75% of all health record data is found in unstructured text, e.g., in physician's notes, discharge summaries, test results, case notes, and so on, the UTAS 112 can utilize uses Natural Language Processing (NLP) models to sort through this enormous quantity of data and retrieve valuable information that is otherwise difficult to retrieve and use without significant manual effort.

Although the UTAS 112 may not be a substitute for professional medical advice, diagnosis, or treatment, the UTAS 112 can provide confidence scores that indicate the level of confidence in the accuracy of the detected entities, which can be used to enable client systems to apply more (or less) scrutiny to its results based on the particular use case. For example, in certain use cases a client may cause the results generated by the UTAS 112 to be reviewed and verified by appropriately-trained human reviewers, though in other use cases such review and verification may be unnecessary or may be only needed for those results exhibiting less than some threshold amount of accuracy based on the confidence scores.

Components of the UTAS 112 may be implemented as software executed by one or more computing devices, as hardware, or as a combination of both hardware and software. As one example, the UTAS 112 may include an orchestrator 116 implemented as software executed by a first one or more computing devices and may further include one or more models 120/124 implemented as software by the first one or more computing devices or a second one or more computing devices.

In some embodiments, the UTAS 112 is implemented as a service within a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, the UTAS 112 described herein, etc. Users 110 (or "customers") of provider networks 100 may utilize one or more user accounts that are associated with a customer account, though these terms may be used somewhat interchangeably depending upon the context of use. Users may utilize a computing device 108 to interact with a provider network 100 across one or more intermediate networks 106 (e.g., the internal via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

For example, in various embodiments, a "serverless" function may include code provided by a user or other entity that can be executed on demand Serverless functions may be maintained within provider network 100 and may be associated with a particular user or account or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. In some embodiments, one or more or all of the components of the UTAS 112 may be implemented as serverless functions, e.g., the orchestrator 116, tokenization and segmentation engine 126 ("TSE"), output consolidator 128, ML models 120/124, etc.

As indicated herein, a user 110 may with to utilize the UTAS 112 to detect entities within medical unstructured text. Thus, the user may utilize a client 109A implemented by a computing device 108 outside the provider network 100 (e.g., as part of a medical application installed on a personal computer or server computing device, as part of a web-based console provided by the provider network 100) or a client 109B implemented by a computing device within the provider network 100 (e.g., as part of an application executed in the provider network 100, such as by a hardware virtualization service, "serverless" on-demand code execution service, etc.) to issue requests 130 at circle (1) to the UTAS 112.

These clients 109 may use the UTAS 112 for a variety of purposes. As one example, a client 109 may be part of an application allowing doctors and health care providers to manage their unstructured notes effectively and rapidly assess medical information about their patients that doesn't easily fit into the forms traditionally used. Analyzing case notes, for instance, may help providers identify candidates for early screening for certain medical conditions before the condition becomes more difficult to treat. It may also allow patients to report their health concerns in a narrative that can provide more information in a simple format, and then make those narratives easily available to providers in a more structured form, allowing more accurate diagnosis of medical conditions.

As another example, a client 109 may operate as part of a clinical research application allowing life sciences or research organizations to optimize the matching process for fitting patients into clinical trials using information from unstructured clinical texts, such as case notes and test results. For instance, for a clinical trial of a new heart medicine, use of the UTAS 112 makes it much simpler to analyze text to find specific information about heart failure patients. The client 109 may also be part of an application to improve pharmacovigilance and post-market surveillance to monitor adverse drug events by using UTAS 112 to detect pertinent information in clinical text that is otherwise difficult to access. Moreover, the client 109 may use the UTAS 112 to assess therapeutic effectiveness by easily detecting vital information in follow-up notes and other clinical texts. For example, it can be easier and more effective to monitor how patients respond to certain therapies by analyzing their narratives.

As yet another example, a client 109 may be part of a medical records application, e.g., a medical billing system payor can use the UTAS 112 to expand its analytics to include the use of unstructured documents such as clinical notes, where more information about a diagnosis as it relates to billing codes can be determined.

The request 130 (and response 132) sent by clients 109 can utilize encrypted connections (e.g., using HTTPS over TLS), and the UTAS 112 in some embodiments does not persistently store any user/client content. Accordingly, the UTAS 112 may qualify as a HIPAA eligible service without requiring users to configure encryption-at-rest within the service.

In some embodiments, the request 130 may be one or either of a "Detect Entities" (or, "DetectEntities") request or a "Detect PHI" (or, "DetectPHI") request. A DetectEntities request may be used to indicate a client's request for the UTAS 112 to examine unstructured clinical text to detect textual references to valuable medical information related to various "entities" such as medical condition, treatment, tests and test results, medication (possibly including dosage, frequency, method of administration, etc.), treatment, Protected Health Information (PHI) data, and so on. In contrast, a DetectPHI request may be used to indicate a client's request for the UTAS 112 to detect references to only one entity—e.g., PHI data such as names, addresses, ages, etc. In other embodiments, other types of requests may be straightforwardly implemented by one of skill in the art based on this provided description to involve more, fewer, and/or different types of entities.

For the sake of illustration, we assume the request 130 sent at circle (1) is a DetectEntities request, instructing the UTAS 112 to inspect provided clinical text for a variety of medical entities and return specific information about any detected entities such as each entity's category, location, and confidence score on that information. In some embodiments, the request 130 includes an amount of unstructured text—e.g., up to 20,000 bytes of characters in some format (e.g., UTF-8).

Figure 2:
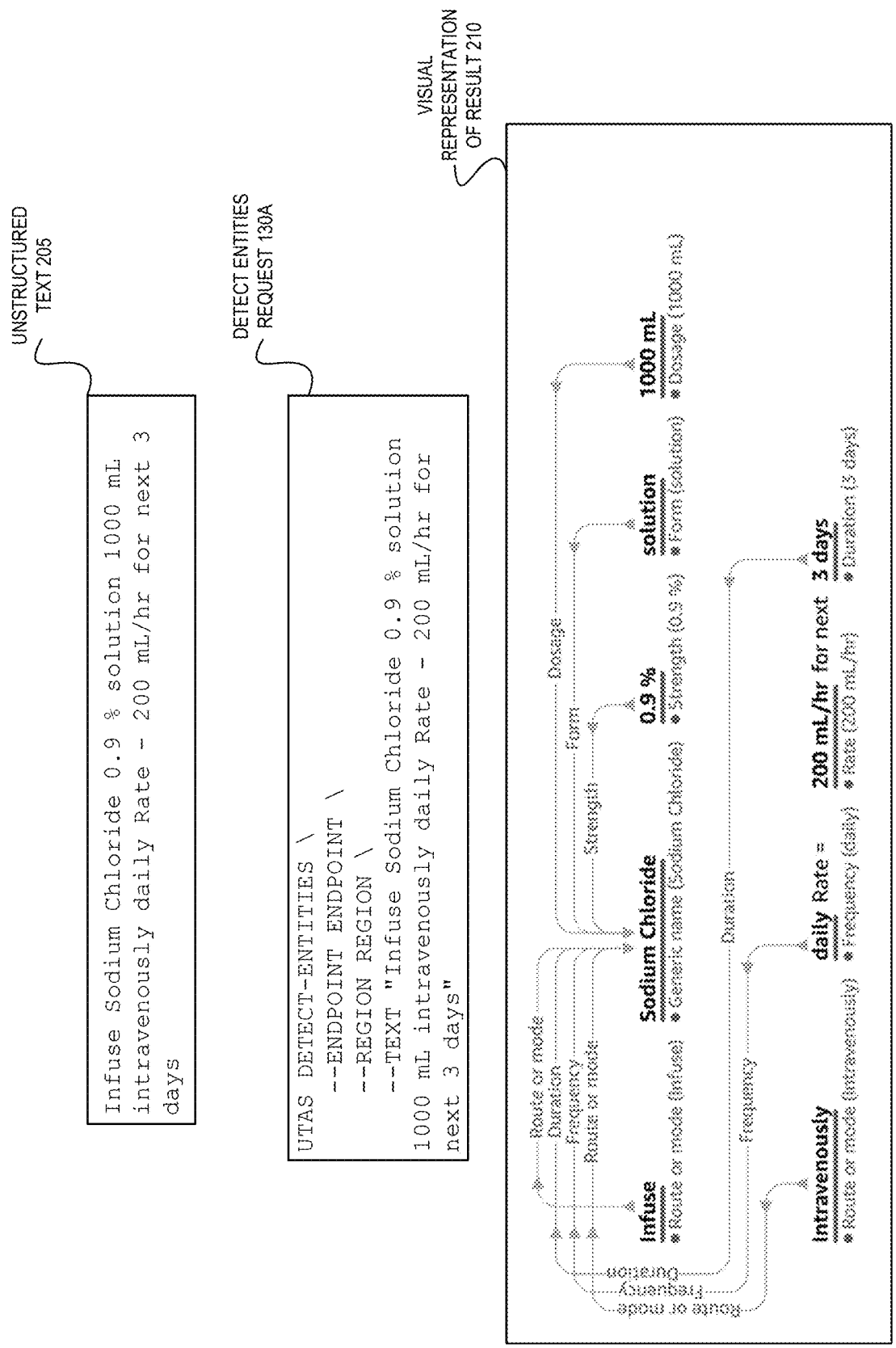
FIG. 2 is a diagram illustrating examples of medical unstructured data, an application programming interface call, and an illustration of detected entities and relationships according to some embodiments.

For example, FIG. 2 is a diagram illustrating examples of medical unstructured data, an application programming interface call, and an illustration of detected entities and relationships according to some embodiments. As shown, a portion of unstructured text 205 may be submitted within the request 130 or otherwise identified by the request 130, such as via an identifier of a storage location, database record, etc., where the text is stored. In this example, the portion of unstructured text 205 reads "Infuse Sodium Chloride 0.9% solution 1000 mL intravenously daily Rate-200 mL/hr for next 3 days". This unstructured text 205 may be provided within a request, such as shown in the exemplary detect entities request 130A, which may be an API call issued to an endpoint associated with the UTAS 112 that identifies one or more of the service ("UTAS"), the method ("DETECT-ENTITIES"), an endpoint, a region, and/or the text itself.

Turning back to FIG. 1, the request 130 can be provided to an orchestrator 116 implementing a "front end" of the service. The orchestrator 116 in some embodiments is implemented by a fleet of multiple compute instances, where each compute instance may implement one or both of a TSE 126 and an output consolidator 128. Thus, in some embodiments, the requests 130 may be load balanced between multiple such orchestrator 116 instances (or TSE 126 instances).

Upon receipt of each request by the orchestrator 116, the request 130 (or elements thereof, such as the text) may be provided to a TSE 126 at circle (2). Each TSE 126 may split the text into one or more segments, which may be based on applying a set of rules that indicate where the text is to be split. For example, the segmentation may include splitting the text based on the existence of newline characters, periods, and/or other delimiters, to yield a set of one or more segments.

In some embodiments, the TSE 126 then tokenizes the segments to identify one or more "tokens" within each segment. A token may be a word or a grouping of characters, and the tokenization may be performed by applying another set of rules that indicate where the segment is to be split. For example, the tokenization may include identifying the existence of spaces, tabs, column delimiters (such as pipes or colons), etc., to thus identify the beginning and end of a token. Thus, the TSE 126 may generate token metadata indicating a beginning location and an ending location of a token (within a segment) or a character length. Thus, for an example segment "Infuse Sodium Chloride 0.9% solution", a token of "Infuse" may be identified via a beginning offset of "0" and an ending offset of "6," or via a beginning offset of "0" and a length of "6." Likewise, a token of "0.9%" (as one example way of tokenizing including the "%" character) may be identified via a beginning offset of "23" and an ending offset of "28," or via a beginning offset of "23" and a length of "5."

In some embodiments, each identified segment of text and metadata identifying the tokens therein is provided, by the orchestrator 116, to multiple ML models 120A-120E according to a "scatter" type technique as reflected by circle (3). Each of the ML models 120A-120E may be trained to detect a particular entity type from within unstructured text, and in some cases, ones of the models 120 may be executed in parallel for a same segment or group of segments. In this example, the orchestrator 116 is shown as utilizing five models 120A-120E, though in other embodiments more or fewer models (e.g., via more or fewer services 118A-118E) may be used.

As illustrated, each ML model 120 may be implemented as part of a service (or "micro-service") that receives inference requests, optionally pre-processes the input data, provides the provided input (or pre-processed input) to an ML model trained to identify a particular type of entity, optionally post-processes the output inference result, and returns the (optionally post-processed) inference result to the client—here, the orchestrator 116. In this example system, a first model 120A may be part of a medication service 118A that identifies medications and/or dosage information at (4A), a second model 120B may be part of a medical condition service 118B that identifies symptoms and diagnosis of medical conditions at (4B), a third model 120C may be part of a PHI service 118C that detects a patient's personal information (e.g., address, age, email address, personal identifier, name, phone number, profession, etc.) at (4C), a fourth model 120D may be part of a Test and Treatment Procedure (TTP) service 118D that detects procedures used to determine a medical condition at (4D), and a fifth model 120E that may be part of an anatomy service 118E that detects references to the parts of the body or body systems and the locations of those parts or systems at (4E).

In some embodiments, one or more of the ML models 120 are trained using annotated training data, e.g., doctors' notes that have been annotated by humans and/or automated processes (e.g., active learning techniques) and the like, to cause the ML models 120 to be able to detect particular entities types. The ML models 120 may be based on a variety of ML algorithms known to those of skill in the art, such as a neural network (e.g., a Long short-term memory (LSTM) neural network or other type of Recurrent Neural Network (RNN)). The training may be performed via use of an ML service and may include the use of hyperparameter tuning techniques to create a highly-accurate model. The resulting trained models, in some embodiments, are hosted by an ML service, which can deploy these models as services.

In some embodiments, the UTAS 112—via use of these ML models—may detect information in multiples classes (or "object types"), such as entities, categories, types, attributes, traits, etc. An entity generally refers to a textual reference to the name of relevant objects, such as people, treatments, medications, or medical conditions—for example, "Ibuprofen" may be an entity. A category generally refers to a generalized grouping to which a detected entity belongs, for example, "Ibuprofen" may be part of a MEDICATION category, where a category may be associated with a particular model 120 and thus entities of that category may be detected by that model. A type generally refers to a type of the entity detected, scoped to a category. For example, "Ibuprofen" is in the GENERIC_NAME type in the MEDICATION category. An attribute generally refers to information related to a detected entity, such as a dosage of a medication—for example, "200 mg" is an attribute of an "Ibuprofen" entity. A trait generally refers to something that the UTAS 112 understands about an entity, based on context. For example, a medication may have a "NEGATION" trait if it determined that a patient is not taking it.

In some embodiments, the medical condition service 118B may, via use of model 120B, detect symptoms and diagnosis of medical conditions. The output of the medical condition service 118B may contains up to two entity types and up to four traits, where one or more traits can be associated with a type. The entity types may be an "ACUITY" that provides a determination of disease instance, such as chronic, acute, sudden, persistent, or gradual, and/or a "DX_NAME" that provides all medical conditions listed. The DX_NAME type may thus include a present illness, reason for visit, medical history, review of systems, family history, or patient education. The traits may include a "DIAGNOSIS" that applies to the DX_NAME type and that provides a medical condition that is determined as a cause or result of the symptoms through physical findings, laboratory or radiological reports, or any other means that the patient may or may not have had. The traits may also include a NEGATION, which is an indication that a result or action is negative or not being performed, a SIGN, which applies to the DX_NAME type and indicates a medical condition that the physician reported, and/or a SYMPTOM, which applies to the DX_NAME type and indicates a medical condition reported by the patient.

For example, upon being provided a segment "Patient is suffering from chronic aching pain 4/10", the medical condition service 118B may return "aching pain" as a DX_NAME type of entity that is of a SYMPTOM trait type, as well as another entity of "chronic" that is of the ACUITY trait type. The medical condition service 118B may also provide associated confidence scores generated by the model 120B when detecting each entity.

This information may be returned to the orchestrator 116 in a variety of formats, such as the following exemplary format. Notably, this example shows a portion which specifies, for each detected entity, one or more of: an identifier ("Id"), a beginning offset and ending offset indicating where in the segment the entity was found, a confidence score generated by the ML model 120B, the text of the entity, a type of the entity, any found traits, etc.

```
{
    "Entities": [
        {
            "Id": 0,
            "BeginOffset": 26,
            "EndOffset": 33,
            "Score": 0.9961825013160706,
            "Text": "chronic",
            "Category": "MEDICAL_CONDITION",
            "Type": "ACUITY",
            "Traits": [ ]
        },
        {
            "Id": 1,
            "BeginOffset": 34,
            "EndOffset": 45,
            "Score": 0.8380221724510193,
            "Text": "aching pain",
            "Category": "MEDICAL_CONDITION",
            "Type": "DX_NAME",
            "Traits": [
                {
                    "Name": "SYMPTOM",
                    "Score": 0.6004688739776611
                }
            ]
        }
    ],
    "UnmappedAttributes": [ ]
}
```

Similarly, in some embodiments, the PHI service 118C may, via use of model 120C, detect PHI-related entities. This may occur as part of a "general" request such as a DetectEntities API request, or may occur responsive to a DetectPHI API request that only solicits the detection of PHI entities. The PHI service 118C may detect a variety of different types of entities, including but not limited to an AGE type that represents components of age, spans of age, or other age mentioned in the unstructured text, a NAME type that represents names mentioned in the text, typically belonging to a patient, family, or provider, a PHONE_OR_FAX type that represents phone numbers or FAX numbers (and may eliminate certain named phone numbers, such as 1-800-QUIT-NOW or 911), an EMAIL type that represents email addresses, an ID type that represents a social security number, medical record number, facility identification number, clinical trial number, certificate or license number, vehicle or device number, or biometric number as it pertains to the patient, place of care, or provider, a URL type that represents a web URL, an ADDRESS type that represents geographical subdivisions of an address of any facility, named medical facilities, or wards within a facility, a PROFESSION type that represents a profession or employer mentioned in a note as it pertains to a patient or the patient's family.

By way of example, an unstructured text input may be "Patient is John Smith, a 48 year old teacher and resident of Seattle, Wash." and the PHI service 118C may return that "John Smith" is an entity of type NAME, "48" is an entity of type AGE, "teacher" is an entity of type PROFESSION, "Seattle, Wash." is an ADDRESS entity.

In some embodiments, the anatomy service 118E may, via use of model 120E, detect references to the parts of the body or body systems and the locations of those parts or systems. The anatomy service 118E may be able to detect multiple (e.g., two) entity types, such as a DIRECTION entity, which is a directional term such as left, right medial, lateral, upper, lower, posterior, anterior, distal, proximal, contralateral, bilateral, ipsilateral, dorsal, ventral, and so on, and/or a SYSTEM_ORGAN_SITE entity, which is a body system, anatomic location or region, and/or body site. As an example, with unstructured text input of "Patient's left lung", the anatomy service 118E may identify "left" as an entity of DIRECTION type and "lung" as an entity of SYSTEM_ORGAN_SITE type.

In some embodiments, the medication service 118A may, via use of model 120A, detect medication and dosage information for a patient. The medication service 118A, in response to a request, may return information that may include some or all of two entity types, seven attributes, and one trait. One or more attributes can apply to an entity type. The entity types may include a BRAND_NAME, which is a copyrighted brand name of the medication or therapeutic agent, or a GENERIC_NAME, which is a non-brand name, ingredient name, or formula mixture of the medication or therapeutic agent. The attributes may include one or more of a DOSAGE attribute representing an amount of medication ordered, a DURATION attribute representing how long the medication should be administered, a FORM attribute representing a form of the medication, a FREQUENCY attribute representing how often to administer the medication, a RATE attribute representing an administration rate of the medication (e.g., for medication infusions or IVs), a ROUTE_OR_MODE attribute representing the administration method of a medication, a STRENGTH attribute for medication infusions or IVs a medication strength, etc. One or more traits may also be detected, such as a NEGATION trait identifying whether there exists an indication that the patient is not taking a medication.

In some embodiments, upon receiving the detected information back from a service (e.g., the medication service 118A), the orchestrator 116 may send this information (optionally along with other information received from other models/services) with the segment at circle (5) to one or more relationship services 122 that utilize one or more relationship models 124A-124N to detect relationships between these entities (or other types of information) at circle (6). These relationship models may be, for example, neural networks such as Convolutional Neural Networks (CNNs) trained with labeled training data indicating relationships between entities and attributes, etc.

In some embodiments the orchestrator 116 sends results obtained from the medication service 118A to a relationship service 122 to cause the relationship service 122 to identify relationships between the detected information—e.g., which attributes belong to (or, are associated with) which entities. This relationship information can be used to generate more detailed results back for the requesting client, allow for more sophisticated exploration or searching of the data, etc. For example, by detecting that an attribute of "80 mg" and an attribute of "daily" is associated with an entity of "Aspirin" in the unstructured text "The patient has been daily taking 80 mg of Aspirin", a client or user may then be able to identify this record when searching for all people who take 80 mg of Aspirin daily, but not identify the record when searching for similar but different things, such as people who take 80 mg of Furosemide daily.

For example, continuing the example provided earlier regarding unstructured text of (or including) "Infuse Sodium Chloride 0.9% solution 1000 mL intravenously daily Rate-200 mL/hr for next 3 days" received in/with a DetectEntities request 130, this segment (along with token information) may be passed at circle (3) to multiple services 118 (e.g., services 118A-118N), and in this case the intermediate results returned from the medication service 118A may indicate that multiple entities (and/or attributes) were found with a threshold amount of confidence, and thus the orchestrator may send on those intermediate results with the segment to a relationship service 122 to identify which attributes correspond to which entities. As shown in the visual representation 210 shown in FIG. 2, this may result in the orchestrator being able to determine that a number of attributes are all related to the "Sodium Chloride" entity— "Infuse" is a "route or mode" attribute, "0.9%" is a strength attribute, "solution" is a form attribute, "1000 mL" is a dosage attribute, "Intravenously" is a route or mode attribute, "daily" is a frequency attribute, and "3 days" is a duration attribute. This visual representation 210 may be provided to the client (or data enabling the client to generate such a visual representation), enabling the client to present this visualization 210 to a user.

For further detail, FIG. 3 is a diagram illustrating an abbreviated example result 300 including detected entities and relationships according to some embodiments. A result provided via an ultimate response 132 may be of a variety of formats. For example, in some embodiments the result includes an entry or node for each detected entity. Each Entity may include an array of Attributes extracted that relate to the entity, a BeginOffset integer that provides the 0-based character offset in the input text that shows where the entity begins, a string Category indicating what type the entity is (e.g., MEDICATION, MEDICAL_CONDITION, PROTECTED_HEALTH_INFORMATION, TEST_TREATMENT_PROCEDURE, ANATOMY, which correspond to models 118/services 118), an EndOffset integer that provides the 0-based character offset in the input text that shows where the entity ends, an Id integer that is a monotonically increasing identifier unique within this response rather than a global unique identifier, a Score float that indicates a level of confidence that the UTAS has in the accuracy of the detection (based on an accuracy/confidence score provided by the respective detecting model), a Text string indicating the segment of input text extracted as this entity, an array of Traits providing contextual information for the entity, a Type string describing the specific type of entity.

Each Attribute may similarly include a BeginOffset integer, an EndOffset integer, an Id, a RelationshipScore float indicating a level of confidence that the UTAS has that this attribute is correctly related to the particular entity, a Score float indicating the level of confidence that UTAS has that the segment of text is correctly recognized as an attribute, a Text string, an array of Traits, a Type string, etc. Each Trait may include, for example, a Name string providing a name or contextual description about the trait, a Score float indicating a level of confidence that UTAS has in the accuracy of this trait, etc.

This information can be beneficially used in a variety of ways. For example, for the unstructured text "Aspirin 100 mg Sodium Chloride 1000 ml", but Aspirin and Sodium Chloride may be recognized as being potentially associated with both 100 mg and 100 ml; however, it would likely be the case that 100 mg would be associated with Aspirin with a very high RelationshipScore and associated with 1000 ml with a very low RelationshipScore (the same, but in the inverse, would likely be true for Sodium Chloride). Thus, embodiments can beneficially provide for various confidences in the detected relationships, which could potentially be used by a client in different ways depending on the context of use.

In FIG. 3, this example (abbreviated) result 300 is shown for the unstructured text "Infuse Sodium Chloride 0.9% solution 1000 mL intravenously daily Rate-200 mL/hr for next 3 days". In this case a top-level entity (of ID=1) exists for "Sodium Chloride" of the MEDICATION category. This entity has multiple attributes—two of which are represented here for the sake of illustration—one for the text "INFUSE" and one for the text "3 DAYS", each having an identified type of attribute, a score, etc. In this case, another set of unmapped attributes are also presented. Such unmapped attributes are those attributes that are unable to be "mapped" to a particular entity with a sufficient amount (e.g., threshold) of confidence, though the attribute itself was found with some threshold amount of confidence. In this example, a medication attribute of "1000 ML" was found as well as a medication attribute of "200 ML/HR".

Turning back to FIG. 1, as another example of involving relationships, in some embodiments the orchestrator 116 sends results obtained from the TTP service 118D to a relationship service 122 to cause the relationship service 122 to identify relationships between the detected information— e.g., which attributes belong to (or, are associated with) which entities.

In some embodiments, the TTP service 118D may, via use of model 120D, detect the procedures used to determine a medical condition. The TTP service 118D may identify, for example, three entity types and two attribute types. One or more attributes can be related to an entity of the TEST_NAME type.

For example, in some embodiments the TTP service 118D can detect PROCEDURE_NAME type entities, which are interventions as a one-time action performed on the patient to treat a medical condition or to provide patient care, and/or TEST_NAME type entities, which are procedures performed on a patient for diagnostic, measurement, screening, or rating that might have a resulting value, which may include a procedure, process, evaluation, or rating to determine a diagnosis, to rule out or find a condition, or to scale or score a patient. The TTP service 118D may additionally or alternatively be able to detect TREATMENT_NAME type entities, which are interventions performed over a span of time for combating a disease or disorder, which can include groupings of medications, such as antivirals and vaccinations.

The TTP service 118D, in some embodiments, can detect attributes such as a TEST_VALUE attribute representing a result of a test (which may apply to the TEST_NAME entity type) and/or TEST_UNIT attribute representing the unit of measure that might accompany the value of the test (which may apply to the TEST_NAME entity type).

As an example, the unstructured text of "Abdominal ultrasound noted acute appendicitis, recommend appendectomy followed by several series of broad spectrum antibiotics" may be analyzed by the TTP service 118D to identify "Abdominal ultrasound" is a TEST_NAME type entity, "acute" is an ACUITY type entity, "appendicitis" is a DX_NAME type entity, that DIAGNOSIS is a trait of the "appendicitis" type entity, that "appendectomy" is a PROCEDURE_NAME type entity, and "broad spectrum antibiotics" is a TREATMENT_NAME type entity.

With the intermediate results obtained from each utilized service—e.g., results from services 118A-118E and service(s) 122 for a DetectEntities request 130, results from PHI service 118C for a DetectPHI request 130, etc. —an output consolidator 128 may operate upon these intermediate results at circle (7) to generate a single result (based on these intermediate results) that can be returned to the client 109 via a response 132 at circle (8).

For example, in some embodiments when the processing is successful, the response is sent back as a HTTP 200 response that carries JSON formatted data. This data may include a collection of the medical entities extracted from the input text and their associated information. For each entity, the response provides the entity text, the entity category, where the entity text begins and ends, and the level of confidence in the detection and analysis. Attributes and traits of the entity are also returned.

In some embodiments, the output consolidator 128 may include a versioning engine 129 that can be utilized to generate a model version token that may be included in the response 132. In some cases, especially when the versions of the models 120/124 may be occasionally or continually updated or changed over time, a model version token may be provided in a response that can be used to identify which versions of which models were utilized to generate the result. The model version token may be generated based on model version identifiers corresponding to software release versions of the models—e.g., a concatenation of model version numbers is generated and then encrypted, etc. In such an example, the client/user may be unable to decrypt or de-obfuscate the model version token, though it could be provided back to the operator of the UTAS 112 who is in possession of the token generation logic and/or key used to encrypt the model version numeric data (e.g., when 2-way encryption is used). Such a scheme enables, for example, the operator of the UTAS 112 to analyze some problematic or unexpected output generated by the UTAS 112 by, among other things, determining which exact versions of the involved model(s) were utilized to generate that result.

The ultimate response can be presented to a user, utilized by an application, persisted for later use, etc. For example, FIG. 4 is a diagram including an illustration of detected entities and relationships from an unstructured medical text along with an exemplary graphical user interface for presenting the detected entities and relationships according to some embodiments.

In this example, a first result user interface 400 is illustrated showing different detected entities, attributes, etc. In this example, various aspects (e.g., entities, attributes, traits, etc.) are shown with underlines—which may be colorized to reflect which category (e.g., MEDICATION, MEDICAL_CONDITION, PROTECTED_HEALTH_INFORMATION, TEST_TREATMENT_PROCEDURE, ANATOMY) the information is. Relationships that are detected may also be shown with arrows linking an attribute to the entity, and in this example the arrows are labeled with the particular attribute identifier of the attribute (e.g., "0.2 mgs" is a strength attribute of the entity "Clonidine").

Another result user interface 410 may be presented—optionally together with the result user interface 400—to present the result information in a different manner In this result user interface 410, a number of "cards" (or entries) are shown that present more information. Each card shows the text and its entity type. Next to each of the entities, a score represents the confidence that the UTAS 112 has in the identification of the text as the type of entity shown. For example, a "Clonidine" medication entity was found with a greater than 99% confidence, while a medical condition of "Sleeping trouble" was found with an 82% confidence that is a symptom trait with a score of 67%.

Figure 5:
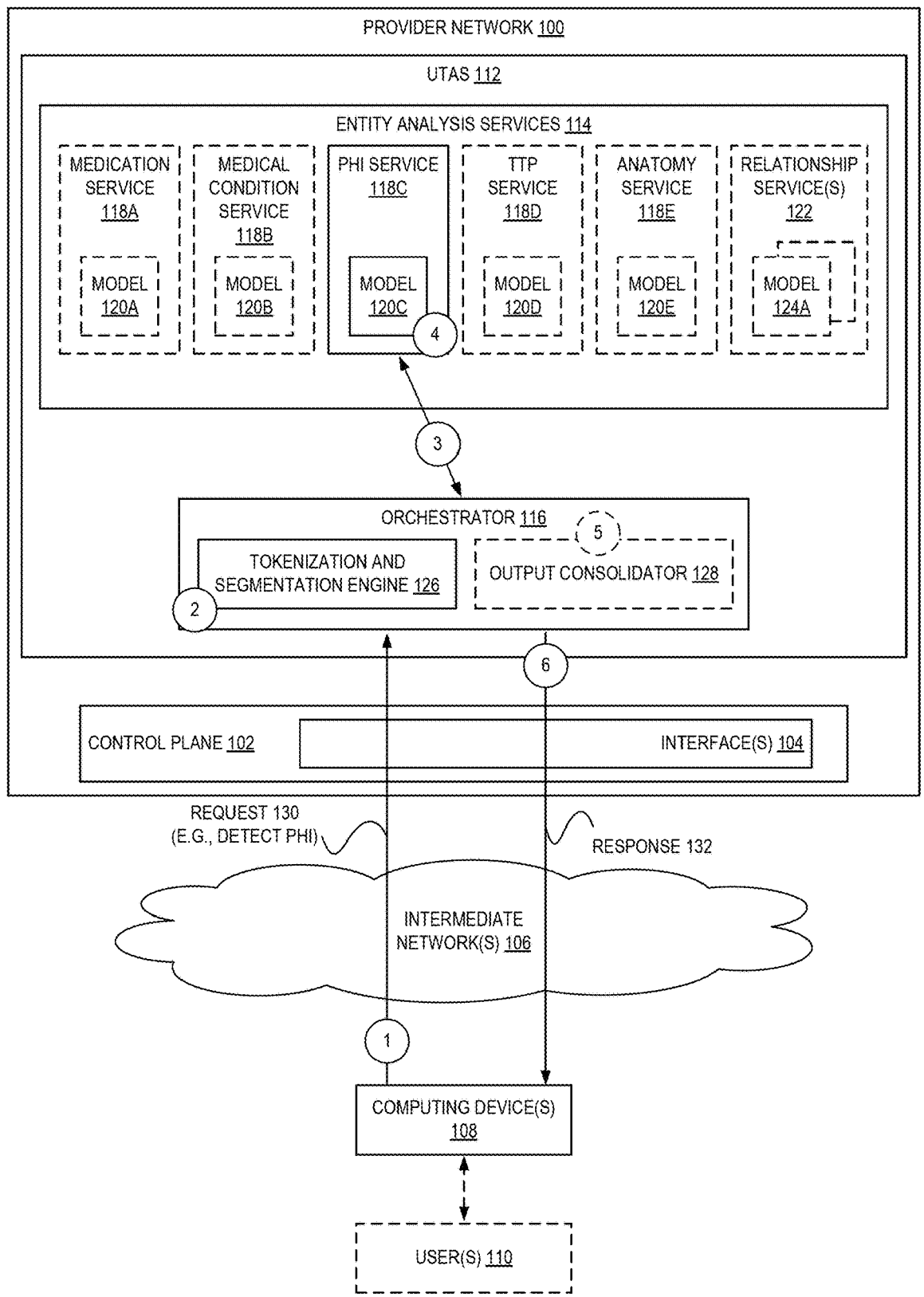
FIG. 5 is a diagram illustrating an environment for synchronous specified entity detection from unstructured text according to some embodiments.

FIG. 5 is a diagram illustrating an environment for synchronous specified entity detection from unstructured text according to some embodiments. As described herein, in some embodiments the orchestrator 116 of the UTAS 112 may utilize multiple ML models 120/124 to detect different types of entities in unstructured text. However, in some embodiments, the orchestrator 116 may also utilize just one service 118C or ML model 120C for this analysis. For example, in some embodiments a client 109A may issue a request 130 (e.g., a Detect PHI request) at circle (1) to detect one particular type of entity (e.g., PHI entities). Again, the request can be segmented and tokenized at circle (2) as described herein, and at circle (3) the segments may be provided to one particular service—e.g., PHI service 118C—to utilize an ML model 120C trained to detect entities of only that type at circle (4), and this information is returned to the orchestrator 116, which optionally could be directly returned within a response 132 at circle (6) or could be modified or consolidated in some manner at circle (5) before being sent in the response 132. In some cases where attributes may be involved, the orchestrator 116 may further utilize one or more relationship services 122 as described above to identify which attributes (or other aspects) correspond to which entities, and then this information returned by the relationship service(s) 122 may also be used by the output consolidator 128 at circle (5) to generate a result to be sent back in the response 132 at circle (6). Although this example involves single entity detect for PHI (via a DetectPHI request, use of a PHI service 118C, etc., it is to be understood that in other embodiments other services (or even combinations of services) and/or requests may be used to allow for different types or collections of types of entities to be detected.

Figure 6:
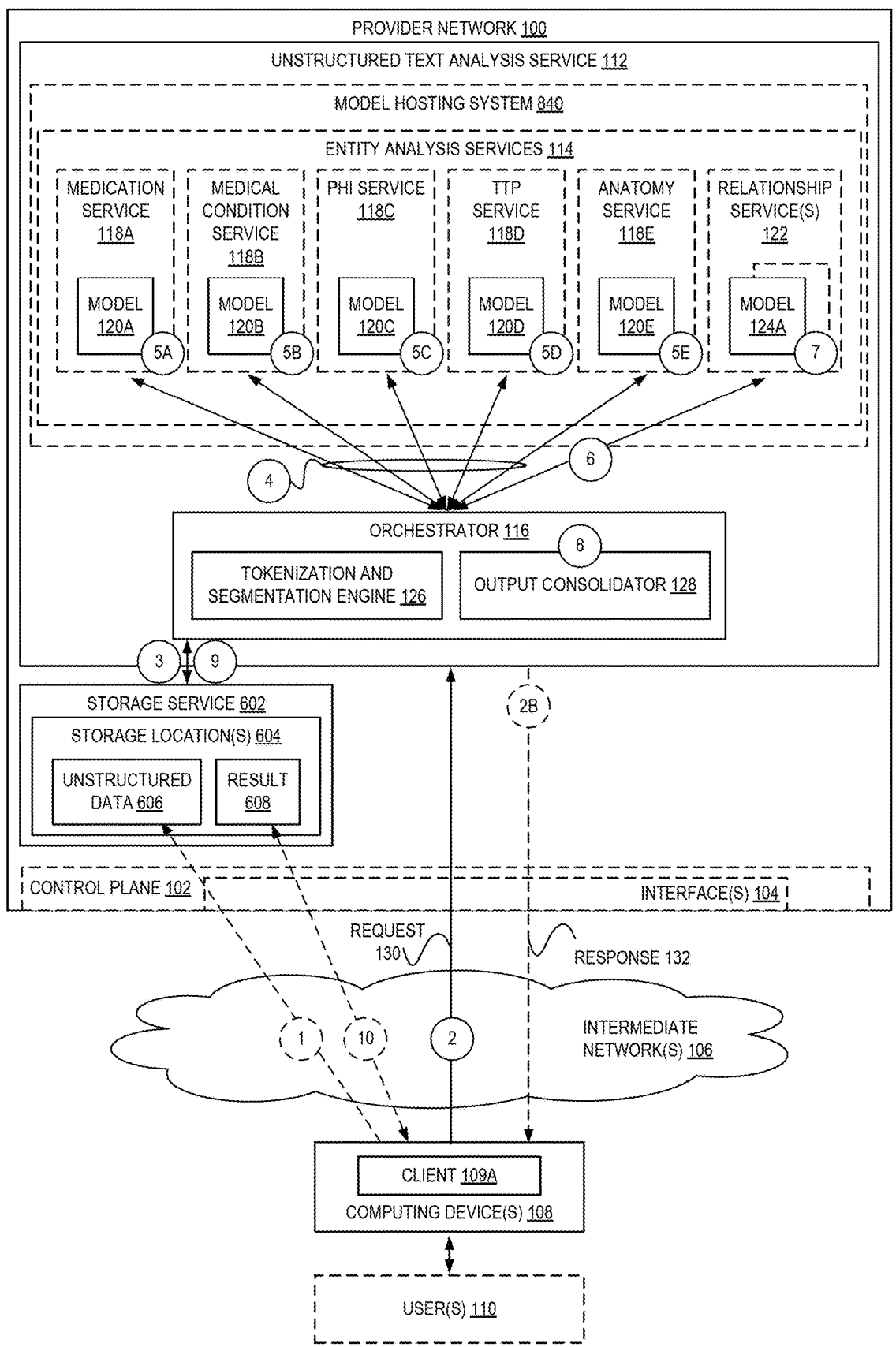
FIG. 6 is a diagram illustrating an environment for asynchronous entity and relationship detection from unstructured text according to some embodiments.

In the embodiments illustrated with regard to FIG. 1 and FIG. 3, the ultimate response 132 may be sent back synchronously (e.g., in a same combination session or connection) to a request 130. However, in other embodiments the process may also be implemented in an asynchronous manner. For example, FIG. 6 is a diagram illustrating an environment for asynchronous entity and relationship detection from unstructured text according to some embodiments.

In this example, a client 109A may provide unstructured text by optionally uploading it as unstructured data 606 to a storage location 604 of a storage service 602 at optional circle (1) and providing an identifier of this location to the UTAS 112 (e.g., within a request 130 sent at circle (2A)), providing the unstructured text directly within the request 130, or providing an identifier of another storage location where the unstructured text is located (e.g., within a database, outside the provider network at a separate storage location, etc.) that allows the UTAS 112 to obtain the unstructured text. The request may be implemented alternatively to, or in addition to, the other types of requests described herein. For example, such an asynchronous request may be a "StartJob" request that identifies a storage location 604 of the unstructured data 606 to be used as input for the job and may further identify the same or a different storage location 604 to be used to store the output results of the job.

Optionally at circle (2B) the UTAS 112 may send a response 132 indicating that the request 130 was received, and/or that the processing is underway. The response 132 may include, for example, a unique identifier associated with the entity detection job that may be utilized to obtain further information regarding the job such as the job's status, the results of the job, etc. In other embodiments, this response 132 may alternatively be sent at a different stage, such as at some point after circle (3), etc., when the orchestrator 116 has verified that it will be able to run the job (e.g., based on it successfully obtaining the unstructured text).

At circle (3) the orchestrator 116 may obtain the unstructured text (as part of unstructured data 606) by sending a request to the storage service 602 based on an identifier of the storage location(s) 604 provided by the request 130 or earlier-provided by the user 110 in another manner (e.g., during a point of configuration) to obtain some or all of the unstructured data 606, and then receiving some or all of the unstructured data 606 from the storage service 602 in response. In some embodiments, the orchestrator 116 may keep this unstructured data 606 in volatile memory only to avoid persisting this data.

Thereafter, the orchestrator 116 may perform entity detection and optionally relationship detection according to one of the various techniques disclosed herein, such as via segmentation and tokenization using the TSE 126, doing a "scatter" of each segment at circle (4) to potentially multiple models 120 at circles (5A)-(5E), optionally sending some of this returned information at circle (6) to one or more relationship services 122 at utilize one or more relationship detecting ML models 124 at circle (7), and consolidating the returned information at circle (8). In some embodiments, the orchestrator 116 may utilize a model hosting system 840 (described later herein with regard to FIG. 8) of an ML service to host and execute the models 120/124 as services 118/122.

Upon generating a result, the orchestrator 116 may delete any copies of the unstructured data 606 made for the processing (e.g., from memory) and/or cause the result 608 to be stored, at circle (9), at a storage location 604 (e.g., of a storage service 602) that may have been specified in the request 130 or another location that may be indicated in the response 132. This allows for the client (or another client, such as an application) to access the result 608 at some point in time—notably, in an non-synchronous manner with the original request 130. For example, the client 109A may send a request at circle (10) to download the result 608, which may be returned to the client 109A by the storage service 602.

In some embodiments, the UTAS 112 may implement other types of API requests to allow users to manage and/or monitor the process of these jobs. For example, a variety of requests such as a StartEntitiesDetectionJob request that is used for starting a detection job (e.g., a "batch" job that performs the detection for many unstructured data elements), a ListEntitiesDetectionJob request that will cause the UTAS 112 to provide as a response details regarding the number of jobs and job statuses for that user/customer, a DescribeEntitiesDetectionJob request that that will cause the UTAS 112 to provide as a response details regarding a specific job identified in the DescribeEntitiesDetectionJob request, a StopEntitiesDetectionJob request that that will cause the UTAS 112 to stop processing a specific job identified in the DescribeEntitiesDetectionJob request, etc.

As described herein the models 120/124 may each be implemented in a different VM, container, or even physical host, which may allow for ease of scaling and excellent performance. However, in some embodiments multiples (or all) of the models 120/124 may implemented in a same VM, container, or physical host (potentially also with some or all of the orchestrator 116 logic), which may potentially eliminate some (or all) network traffic sent between these various components and thus may also result in improved performance. In such cases, a purposefully large VM may be chosen (or flexibly scaled up over time) to allow for high performance for all of these models. For example, a single "large" resource-rich VM (e.g., having a relatively large amount of processing capability, memory, specialized computational hardware available, etc.) may be selected to run a pre-processing container, one or more inference containers (for the one or more models), a post-processing container (e.g., to make the data compatible with analytic tools), etc.

Figure 7:
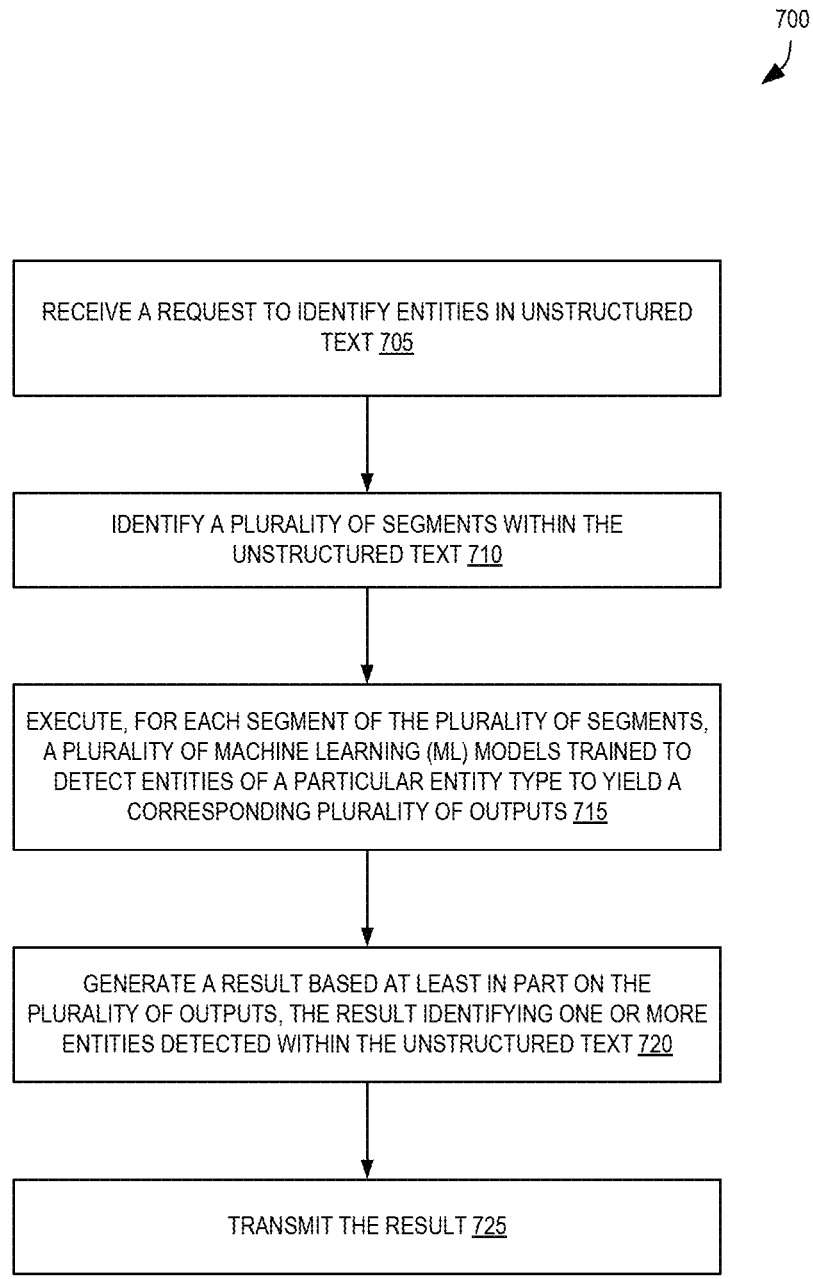
FIG. 7 is a flow diagram illustrating operations of a method for entity detection from unstructured text according to some embodiments.

FIG. 7 is a flow diagram illustrating operations of a method for entity detection from unstructured text according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the UTAS 112 depicted in the other figures.

The operations 700 include, at block 705, receiving a request to identify entities in unstructured text. The request may be received at a web service endpoint of a provider network and may include an identifier of whether a particular type of entity (e.g., personal health information entities) or multiple entities are to be detected within the unstructured text. The request may include the unstructured text (e.g., alphanumeric data) itself or may include an identifier of a storage location where the unstructured text may be obtained from. The request may include an identifier of a storage location where a result is to be stored.

In some embodiments, the plurality of entities includes one or more, two or more, three or more, etc., or all of: a medication; a medical condition; personal health information; a test, treatment, or procedure; or an anatomical body part or system. However, in other embodiments, other types of entities may be detected.

The operations 700 further include, at block 710, identifying a plurality of segments within the unstructured text. Block 710 may be performed based on applying one or more rules to the unstructured text to identify locations where the unstructured text is to be split. The one or more rules may specify one or more delimiters (e.g., a period character, a newline, etc.) that signify the end and/or beginning of a segment.

In some embodiments, the operations 700 further include identifying tokens within the plurality of segments, which may be performed based on applying another one or more rules to the unstructured text (e.g., each of the segments) to identify locations of each token. The another one or more rules may specify one or more delimiters (e.g., a space character, a semicolon, a tab, etc.) that signify the end and/or beginning of a token.

The operations 700 further include, at block 715, executing, for each segment of the plurality of segments, a plurality of ML models trained to detect entities of a particular entity type to yield a corresponding plurality of outputs. In some embodiments, each of the plurality of ML models comprises a Recurrent Neural Network (RNN) model. Each of the plurality of ML models may be implemented by a separate service.

The operations 700 further include, at block 720, generating a result based at least in part on the plurality of outputs, the result identifying one or more entities detected within the unstructured text. The result may include, for each of the entities, an identifier of the entity, a beginning and ending offset of the entity, a confidence score for the detection of the entity, the text of the entity, a category of the entity, any associated traits or attributes found within the unstructured text that are associated with the entity, etc.

In some embodiments, the operations 700 further include, prior to block 720, executing, for each segment of the plurality of segments using at least the output from at least one of the plurality of ML models, another ML model trained to identify relationships between attributes and ones of the entities to yield another output, wherein the result is further based on the another output. For example, in some embodiments where one or more attributes are found that correspond to a detected entity, a block is included in the result for each of the one or more attributes that includes a type of the attribute, a confidence score in the detection of the attribute, a relationship score indicating a confidence in the association between the attribute and an associated entity, an identifier of the attribute, a beginning and ending offset of the attribute, the text of the attribute, any traits found to be associated with the attribute, etc. In some embodiments, the another ML model is a convolutional neural network (CNN) model.

In some embodiments, each of the plurality of ML models is executed by a separate one or more virtual machines or containers within a provider network. However, the plurality of ML models, in some embodiments, are implemented within a single container or a single virtual machine.

The operations 700 further include, at block 725, transmitting the result (e.g., to a client that issued the request, to a storage location within or outside of a same provider network, etc.).

In some embodiments, the operations 700 further include identifying, for each of the plurality of segments, one or more locations of one or more tokens within the corresponding segment, wherein for each segment each of the plurality of requests further includes identifiers of the one or more locations, and wherein each of the plurality of ML models detects entities using, as input to the ML model, the segment and the identifiers of the one or more locations.

In some embodiments, the operations 700 further include obtaining a plurality of model version identifiers corresponding to software release versions of the plurality of ML models; and generating a model version token based on the plurality of model version identifiers, wherein the response further comprises the model version token.

The request, in some embodiments, was originated by a client and indicates that the result is to be generated and returned to the client synchronously via a same network connection; and the transmitting of the result occurs via the same network connection.

The request, in some embodiments, was originated by a client and identifies at least a storage location where the result is to be stored; and transmitting the result comprises sending the result to a storage service to be stored at the storage location.

Figure 8:
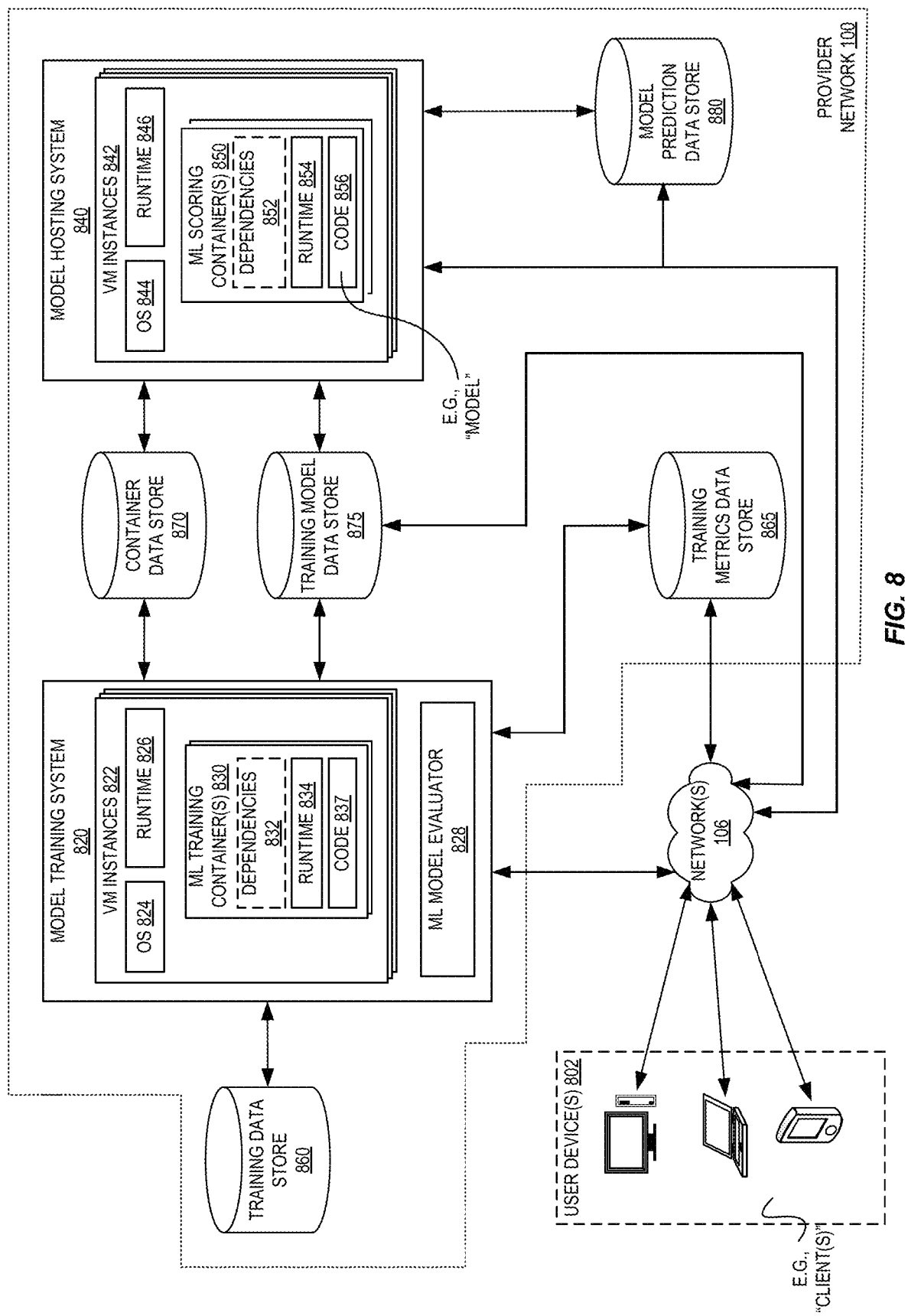
FIG. 8 is a block diagram of an illustrative operating environment in which machine learning models are trained and hosted according to some embodiments.

FIG. 8 is a block diagram of an illustrative operating environment in which ML models are trained and hosted according to some embodiments. The operating environment includes end user devices 802 (e.g., a PC or mobile device, such as computing device(s) 108), a model training system 820, a model hosting system 840, a training data store 860, a training metrics data store 865, a container data store 870, a training model data store 875, and a model prediction data store 880. AN ML service described herein may include one or more of these entities, such as the model hosting system 840, model training system 820, etc.

In some embodiments, users, by way of user devices 802, interact with the model training system 820 to provide data that causes the model training system 820 to train one or more ML models. AN ML model, generally, may be thought of as one or more equations that are "trained" using a set of data. In some embodiments, the model training system 820 provides ML functionalities as a Web service, and thus messaging between user devices 802 and the model training system 820 (or provider network 100), and/or between components of the model training system 820 (or provider network 100), may utilize HTTP messages to transfer data in a machine-readable file format, such as eXtensible Markup Language (XML) or JavaScript Object Notation (JSON).

The user devices 802 can interact with the model training system 820 via frontend 829 of the model training system 820. For example, a user device 802 can provide a training request to the frontend 829 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train an ML model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines an ML model. The executable instructions (e.g., the algorithm) can be written in any programming language (e.g., Python, Ruby, C++, Java, etc.). In some embodiments, the algorithm is pre-generated and obtained by a user, via the user device 802, from an algorithm repository (e.g., a network-accessible marketplace, a data store provided by an ML training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 802 may provide, in the training request, an algorithm written in any programming language. The model training system 820 packages the algorithm into a container (optionally with other code, such as a "base" ML algorithm supplemented with user-provided code) that is eventually loaded into a virtual machine instance 822 for training an ML model, as described in greater detail below. For example, a user, via a user device 802, may develop an algorithm/code using an application (e.g., an interactive web-based programming environment) and cause the algorithm/code to be provided—perhaps as part of a training request (or referenced in a training request)—to the model training system 820, where this algorithm/code may be containerized on its own or used together with an existing container having an ML framework, for example.

In some embodiments, instead of providing a container image in the training request, the user device 802 provides, in the training request, an indicator of a container image (e.g., an indication of an address or a location at which a container image is stored). For example, the container image can be stored in a container data store 870, and this container image may have been previously created/uploaded by the user. The model training system 820 can retrieve the container image from the indicated location and create a container using the retrieved container image. The container is then loaded into a virtual machine instance 822 for training an ML model, as described in greater detail below.

The model training system 820 can use the information provided by the user device 802 to train an ML model in one or more pre-established virtual machine instances 822 in some embodiments. In particular, the model training system 820 includes a single physical computing device or multiple physical computing devices that are interconnected using one or more computing networks (not shown), where the physical computing device(s) host one or more virtual machine instances 822. The model training system 820 can handle the acquisition and configuration of compute capacity (e.g., containers, instances, etc., which are described in greater detail below) based on the information describing the computing machine on which to train an ML model provided by the user device 802. The model training system 820 can then train ML models using the compute capacity, as is described in greater detail below. The model training system 820 can automatically scale up and down based on the volume of training requests received from user devices 802 via frontend 829, thereby relieving the user from the burden of having to worry about over-utilization (e.g., acquiring too little computing resources and suffering performance issues) or under-utilization (e.g., acquiring more computing resources than necessary to train the ML models, and thus overpaying).

In some embodiments, the virtual machine instances 822 are utilized to execute tasks. For example, such tasks can include training an ML model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be utilized to isolate execution of a task from other processes (e.g., task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines an ML model. Changes made to the ML training containers 830 (e.g., creation of new files, modification of existing files, deletion of files, etc.) are stored in the top container layer. If an ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (e.g., the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines an ML model, which may reference (or utilize) code or libraries from dependencies 832. The runtime 834 is configured to execute the code 837 in response to an instruction to begin ML model training. Execution of the code 837 results in the generation of model data, as described in greater detail below.

In some embodiments, the code 837 includes executable instructions that represent algorithms that define different ML models. For example, the code 837 includes one set of executable instructions that represent a first algorithm that defines a first ML model and a second set of executable instructions that represent a second algorithm that defines a second ML model. In some embodiments, the virtual machine instance 822 executes the code 837 and trains all of the ML models. In some embodiments, the virtual machine instance 822 executes the code 837, selecting one of the ML models to train. For example, the virtual machine instance 822 can identify a type of training data indicated by the training request and select an ML model to train (e.g., execute the executable instructions that represent an algorithm that defines the selected ML model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 820 uses one or more container images included in a training request (or a container image retrieved from the container data store 870 in response to a received training request) to create and initialize an ML training container 830 in a virtual machine instance 822. For example, the model training system 820 creates an ML training container 830 that includes the container image(s) and/or a top container layer.

Prior to beginning the training process, in some embodiments, the model training system 820 retrieves training data from the location indicated in the training request. For example, the location indicated in the training request can be a location in the training data store 860. Thus, the model training system 820 retrieves the training data from the indicated location in the training data store 860. In some embodiments, the model training system 820 does not retrieve the training data prior to beginning the training process. Rather, the model training system 820 streams the training data from the indicated location during the training process. For example, the model training system 820 can initially retrieve a portion of the training data and provide the retrieved portion to the virtual machine instance 822 training the ML model. Once the virtual machine instance 822 has applied and used the retrieved portion or once the virtual machine instance 822 is about to use all of the retrieved portion (e.g., a buffer storing the retrieved portion is nearly empty), then the model training system 820 can retrieve a second portion of the training data and provide the second retrieved portion to the virtual machine instance 822, and so on.

To perform the ML model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train an ML model. The virtual machine instance 822 executes some or all of the executable instructions according to the hyperparameter values included in the training request. As an illustrative example, the virtual machine instance 822 trains an ML model by identifying values for certain parameters (e.g., coefficients, weights, centroids, etc.). The identified values depend on hyperparameters that define how the training is performed. Thus, the virtual machine instance 822 can execute the executable instructions to initiate an ML model training process, where the training process is run using the hyperparameter values included in the training request. Execution of the executable instructions can include the virtual machine instance 822 applying the training data retrieved by the model training system 820 as input parameters to some or all of the instructions being executed.

In some embodiments, executing the executable instructions causes the virtual machine instance 822 (e.g., the ML training container 830) to generate model data. For example, the ML training container 830 generates model data and stores the model data in a file system of the ML training container 830. The model data includes characteristics of the ML model being trained, such as a number of layers in the ML model, hyperparameters of the ML model, coefficients of the ML model, weights of the ML model, and/or the like. In particular, the generated model data includes values for the characteristics that define an ML model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 820 itself) pulls the generated model data from the ML training container 830 and stores the generated model data in the training model data store 875 in an entry associated with the virtual machine instance 822 and/or the ML model being trained. In some embodiments, the virtual machine instance 822 generates a single file that includes model data and stores the single file in the training model data store 875. In some embodiments, the virtual machine instance 822 generates multiple files during the course of training an ML model, where each file includes model data. In some embodiments, each model data file includes the same or different model data information (e.g., one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained ML model during different stages of the training process. Accordingly, before training is complete, a user, via the user device 802 can submit a deployment and/or execution request in a manner as described below to deploy and/or execute a version of a partially trained ML model (e.g., an ML model trained as of a certain stage in the training process). A version of a partially-trained ML model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 820 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (e.g., information indicating that N ML training containers 830 are collectively training an ML model and that a particular ML training container 830 receiving the configuration information is ML training container 830 number X of N), which can be included in the resulting model data. By parallelizing the training process, the model training system 820 can significantly reduce the training time in some embodiments.

In some embodiments, a plurality of virtual machine instances 822 execute code 837 stored in a plurality of ML training containers 830. For example, the resources used to train a particular ML model can exceed the limitations of a single virtual machine instance 822. However, the algorithm included in the container image can be in a format that allows for the parallelization of the training process. Thus, the model training system 820 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 820 can further provide configuration information to each ML training container 830 via the virtual machine instances 822 (e.g., information indicating that N ML training containers 830 are collectively training an ML model and that a particular ML training container 830 receiving the configuration information is ML training container 830 number X of N, information indicating that M virtual machine instances 822 are collectively training an ML model and that a particular ML training container 830 receiving the configuration information is initialized in virtual machine instance 822 number Y of M, etc.), which can be included in the resulting model data. As described above, by parallelizing the training process, the model training system 820 can significantly reduce the training time in some embodiments.

In some embodiments, the model training system 820 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 820 includes an ML model evaluator 828. The ML model evaluator 828 can monitor virtual machine instances 822 as ML models are being trained, obtaining the generated model data and processing the obtained model data to generate model metrics. For example, the model metrics can include quality metrics, such as an error rate of the ML model being trained, a statistical distribution of the ML model being trained, a latency of the ML model being trained, a confidence level of the ML model being trained (e.g., a level of confidence that the accuracy of the ML model being trained is known, etc. The ML model evaluator 828 can obtain the model data for an ML model being trained and evaluation data from the training data store 860. The evaluation data is separate from the data used to train an ML model and includes both input data and expected outputs (e.g., known results), and thus the ML model evaluator 828 can define an ML model using the model data and execute the ML model by providing the input data as inputs to the ML model. The ML model evaluator 828 can then compare the outputs of the ML model to the expected outputs and determine one or more quality metrics of the ML model being trained based on the comparison (e.g., the error rate can be a difference or distance between the ML model outputs and the expected outputs).

The ML model evaluator 828 periodically generates model metrics during the training process and stores the model metrics in the training metrics data store 865 in some embodiments. While the ML model is being trained, a user, via the user device 802, can access and retrieve the model metrics from the training metrics data store 865. The user can then use the model metrics to determine whether to adjust the training process and/or to stop the training process. For example, the model metrics can indicate that the ML model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 802, can transmit a request to the model training system 820 to modify the ML model being trained (e.g., transmit a modification request). The request can include a new or modified container image, a new or modified algorithm, new or modified hyperparameter(s), and/or new or modified information describing the computing machine on which to train an ML model. The model training system 820 can modify the ML model accordingly. For example, the model training system 820 can cause the virtual machine instance 822 to optionally delete an existing ML training container 830, create and initialize a new ML training container 830 using some or all of the information included in the request, and execute the code 837 stored in the new ML training container 830 to restart the ML model training process. As another example, the model training system 820 can cause the virtual machine instance 822 to modify the execution of code stored in an existing ML training container 830 according to the data provided in the modification request. In some embodiments, the user, via the user device 802, can transmit a request to the model training system 820 to stop the ML model training process. The model training system 820 can then instruct the virtual machine instance 822 to delete the ML training container 830 and/or to delete any model data stored in the training model data store 875.

As described below, in some embodiments, the model data stored in the training model data store 875 is used by the model hosting system 840 to deploy ML models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines an ML model. Thus, the robotic device can provide the captured input data as an input to the ML model, resulting in an output. The robotic device can then perform an action (e.g., move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (e.g., rapid initialization of ML model training in ML training container(s) 830) in response to training requests.

In some embodiments, the model training system 820 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 802, the model hosting system 840, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 840 includes a single physical computing device or multiple physical computing devices that are interconnected using one or more computing networks (not shown), where the physical computing device(s) host one or more virtual machine instances 842. The model hosting system 840 can handle the acquisition and configuration of compute capacity (e.g., containers, instances, etc.) based on demand for the execution of trained ML models. The model hosting system 840 can then execute ML models using the compute capacity, as is described in greater detail below. The model hosting system 840 can automatically scale up and down based on the volume of execution requests received from user devices 802 via frontend 849 of the model hosting system 840, thereby relieving the user from the burden of having to worry about over-utilization (e.g., acquiring too little computing resources and suffering performance issues) or under-utilization (e.g., acquiring more computing resources than necessary to run the ML models, and thus overpaying).

In some embodiments, the virtual machine instances 842 are utilized to execute tasks. For example, such tasks can include executing an ML model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (e.g., task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines an ML model. Changes made to the ML scoring containers 850 (e.g., creation of new files, modification of existing files, deletion of files, etc.) are stored in the top container layer. If an ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (e.g., supporting software such as libraries) needed by the code 856 in some embodiments. The runtime 854 can be defined by one or more executable instructions that form at least a portion of a container image that is used to form the ML scoring container 850 (e.g., the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines an ML model, which may reference dependencies 852. The code 856 can also include model data that represent characteristics of the defined ML model, as described in greater detail below. The runtime 854 is configured to execute the code 856 in response to an instruction to begin execution of an ML model. Execution of the code 856 results in the generation of outputs (e.g., predicted or "inferred" results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 840 uses one or more container images included in a deployment request (or a container image retrieved from the container data store 870 in response to a received deployment request) to create and initialize an ML scoring container 850 in a virtual machine instance 842. For example, the model hosting system 840 creates an ML scoring container 850 that includes the container image(s) and/or a top container layer.

As described above, a user device 802 can submit a deployment request and/or an execution request to the model hosting system 840 via the frontend 849 in some embodiments. A deployment request causes the model hosting system 840 to deploy a trained ML model into a virtual machine instance 842. For example, the deployment request can include an identification of an endpoint (e.g., an endpoint name, such as an HTTP endpoint name) and an identification of one or more trained ML models (e.g., a location of one or more model data files stored in the training model data store 875). Optionally, the deployment request also includes an identification of one or more container images stored in the container data store 870.

Upon receiving the deployment request, the model hosting system 840 initializes ones or more ML scoring containers 850 in one or more hosted virtual machine instance 842. In embodiments in which the deployment request includes an identification of one or more container images, the model hosting system 840 forms the ML scoring container(s) 850 from the identified container image(s). For example, a container image identified in a deployment request can be the same container image used to form an ML training container 830 used to train the ML model corresponding to the deployment request. Thus, the code 856 of the ML scoring container(s) 850 includes one or more executable instructions in the container image(s) that represent an algorithm that defines an ML model. In embodiments in which the deployment request does not include an identification of a container image, the model hosting system 840 forms the ML scoring container(s) 850 from one or more container images stored in the container data store 870 that are appropriate for executing the identified trained ML model(s). For example, an appropriate container image can be a container image that includes executable instructions that represent an algorithm that defines the identified trained ML model(s).

The model hosting system 840 further forms the ML scoring container(s) 850 by retrieving model data corresponding to the identified trained ML model(s) in some embodiments. For example, the deployment request can identify a location of model data file(s) stored in the training model data store 875. In embodiments in which a single model data file is identified in the deployment request, the model hosting system 840 retrieves the identified model data file from the training model data store 875 and inserts the model data file into a single ML scoring container 850, which forms a portion of code 856. In some embodiments, the model data file is archived or compressed (e.g., formed from a package of individual files). Thus, the model hosting system 840 unarchives or decompresses the model data file to obtain multiple individual files and inserts the individual files into the ML scoring container 850. In some embodiments, the model hosting system 840 stores the model data file in the same location as the location in which the model data file was stored in the ML training container 830 that generated the model data file. For example, the model data file initially was stored in the top container layer of the ML training container 830 at a certain offset, and the model hosting system 840 then stores the model data file in the top container layer of the ML scoring container 850 at the same offset.

In embodiments in which multiple model data files are identified in the deployment request, the model hosting system 840 retrieves the identified model data files from the training model data store 875. The model hosting system 840 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained ML models because the trained ML models are related (e.g., the output of one trained ML model is used as an input to another trained ML model). Thus, the user may desire to deploy multiple ML models to eventually receive a single output that relies on the outputs of multiple ML models.

In some embodiments, the model hosting system 840 associates the initialized ML scoring container(s) 850 with the endpoint identified in the deployment request. For example, each of the initialized ML scoring container(s) 850 can be associated with a network address. The model hosting system 840 can map the network address(es) to the identified endpoint, and the model hosting system 840 or another system (e.g., a routing system, not shown) can store the mapping. Thus, a user device 802 can refer to trained ML model(s) stored in the ML scoring container(s) 850 using the endpoint. This allows for the network address of an ML scoring container 850 to change without causing the user operating the user device 802 to change the way in which the user refers to a trained ML model.

Once the ML scoring container(s) 850 are initialized, the ML scoring container(s) 850 are ready to execute trained ML model(s). In some embodiments, the user device 802 transmits an execution request to the model hosting system 840 via the frontend 849, where the execution request identifies an endpoint and includes an input to an ML model (e.g., a set of input data). The model hosting system 840 or another system (e.g., a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 840 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the ML model characteristics and the input parameters provided, execution of the executable instructions by the virtual machine instance 842 can be completed, resulting in an output.

In some embodiments, the virtual machine instance 842 stores the output in the model prediction data store 880. Alternatively or in addition, the virtual machine instance 842 transmits the output to the user device 802 that submitted the execution result via the frontend 849.

In some embodiments, the execution request corresponds to a group of related trained ML models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the ML model. Execution of the second code 856 results in a second output. The virtual machine instance 842 that initialized the second ML scoring container 850 can then transmit the second output to the model prediction data store 880 and/or the user device 802 via the frontend 849 (e.g., if no more trained ML models are needed to generate an output) or transmit the second output to a third ML scoring container 850 initialized in the same or different virtual machine instance 842 (e.g., if outputs from one or more additional trained ML models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (e.g., rapid initialization of ML scoring container(s) 850, rapid execution of code 856 in ML scoring container(s), etc.) in response to deployment and/or execution requests.

In some embodiments, the model hosting system 840 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 802, the model training system 820, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of ML models, such as multi-arm bandit models, reinforcement learning models, ensemble ML models, deep learning models, or the like.

The model training system 820 and the model hosting system 840 depicted in FIG. 8 are not meant to be limiting. For example, the model training system 820 and/or the model hosting system 840 could also operate within a computing environment having a fewer or greater number of devices than are illustrated in FIG. 8. Thus, the depiction of the model training system 820 and/or the model hosting system 840 in FIG. 8 may be taken as illustrative and not limiting to the present disclosure. For example, the model training system 820 and/or the model hosting system 840 or various constituents thereof could implement various Web services components, hosted or "cloud" computing environments, and/or peer-to-peer network configurations to implement at least a portion of the processes described herein. In some embodiments, the model training system 820 and/or the model hosting system 840 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 829 processes all training requests received from user devices 802 and provisions virtual machine instances 822. In some embodiments, the frontend 829 serves as a front door to all the other services provided by the model training system 820. The frontend 829 processes the requests and makes sure that the requests are properly authorized. For example, the frontend 829 may determine whether the user associated with the training request is authorized to initiate the training process.

Similarly, frontend 849 processes all deployment and execution requests received from user devices 802 and provisions virtual machine instances 842. In some embodiments, the frontend 849 serves as a front door to all the other services provided by the model hosting system 840. The frontend 849 processes the requests and makes sure that the requests are properly authorized. For example, the frontend 849 may determine whether the user associated with a deployment request or an execution request is authorized to access the indicated model data and/or to execute the indicated ML model.

The training data store 860 stores training data and/or evaluation data. The training data can be data used to train ML models and evaluation data can be data used to evaluate the performance of ML models. In some embodiments, the training data and the evaluation data have common data. In some embodiments, the training data and the evaluation data do not have common data. In some embodiments, the training data includes input data and expected outputs. While the training data store 860 is depicted as being located external to the model training system 820 and the model hosting system 840, this is not meant to be limiting. For example, in some embodiments not shown, the training data store 860 is located internal to at least one of the model training system 820 or the model hosting system 840.

In some embodiments, the training metrics data store 865 stores model metrics. While the training metrics data store 865 is depicted as being located external to the model training system 820 and the model hosting system 840, this is not meant to be limiting. For example, in some embodiments not shown, the training metrics data store 865 is located internal to at least one of the model training system 820 or the model hosting system 840.

The container data store 870 stores container images, such as container images used to form ML training containers 830 and/or ML scoring containers 850, that can be retrieved by various virtual machine instances 822 and/or 842. While the container data store 870 is depicted as being located external to the model training system 820 and the model hosting system 840, this is not meant to be limiting. For example, in some embodiments not shown, the container data store 870 is located internal to at least one of the model training system 820 and the model hosting system 840.

The training model data store 875 stores model data files. In some embodiments, some of the model data files are comprised of a single file, while other model data files are packages of multiple individual files. While the training model data store 875 is depicted as being located external to the model training system 820 and the model hosting system 840, this is not meant to be limiting. For example, in some embodiments not shown, the training model data store 875 is located internal to at least one of the model training system 820 or the model hosting system 840.

The model prediction data store 880 stores outputs (e.g., execution results) generated by the ML scoring containers 850 in some embodiments. While the model prediction data store 880 is depicted as being located external to the model training system 820 and the model hosting system 840, this is not meant to be limiting. For example, in some embodiments not shown, the model prediction data store 880 is located internal to at least one of the model training system 820 and the model hosting system 840.

While the model training system 820, the model hosting system 840, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as an ML service) can communicate with one or more of the user devices 802 via the one or more network(s) 106.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 820 and/or the model hosting system 840 provides the user devices 802 with one or more user interfaces, command-line interfaces (CLI), application programming interfaces (API), and/or other programmatic interfaces for submitting training requests, deployment requests, and/or execution requests. In some embodiments, the user devices 802 can execute a stand-alone application that interacts with the model training system 820 and/or the model hosting system 840 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
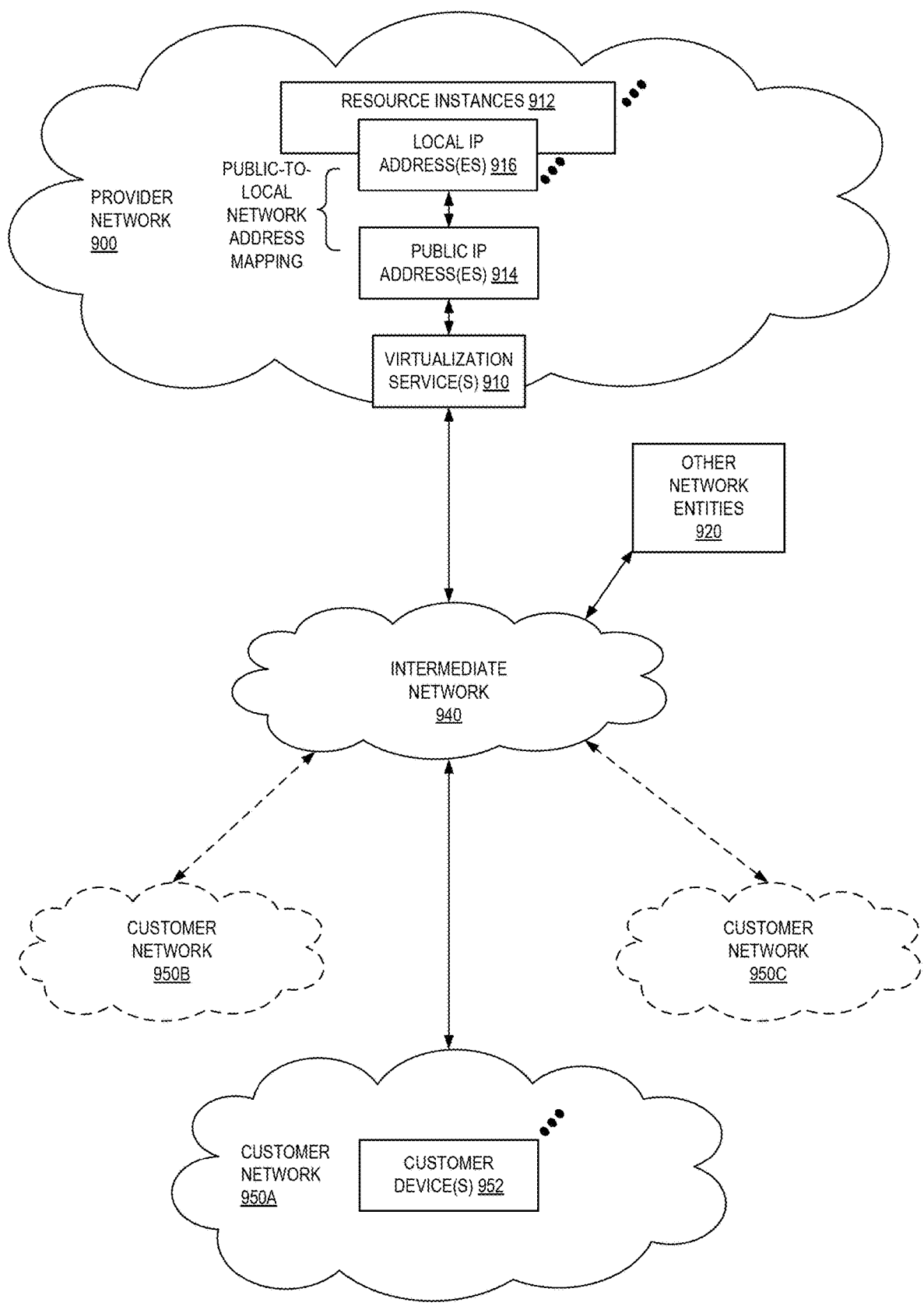
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
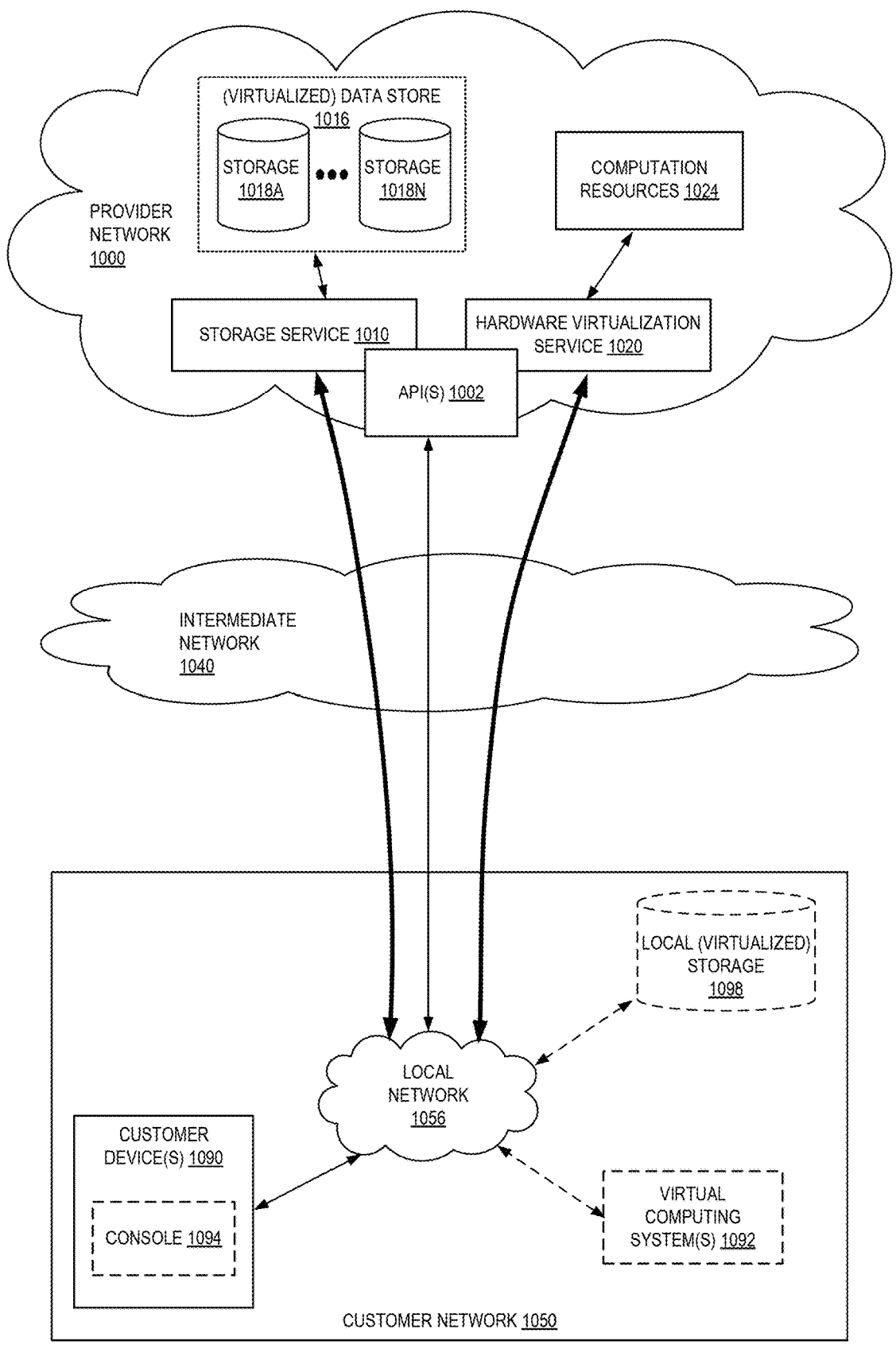
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
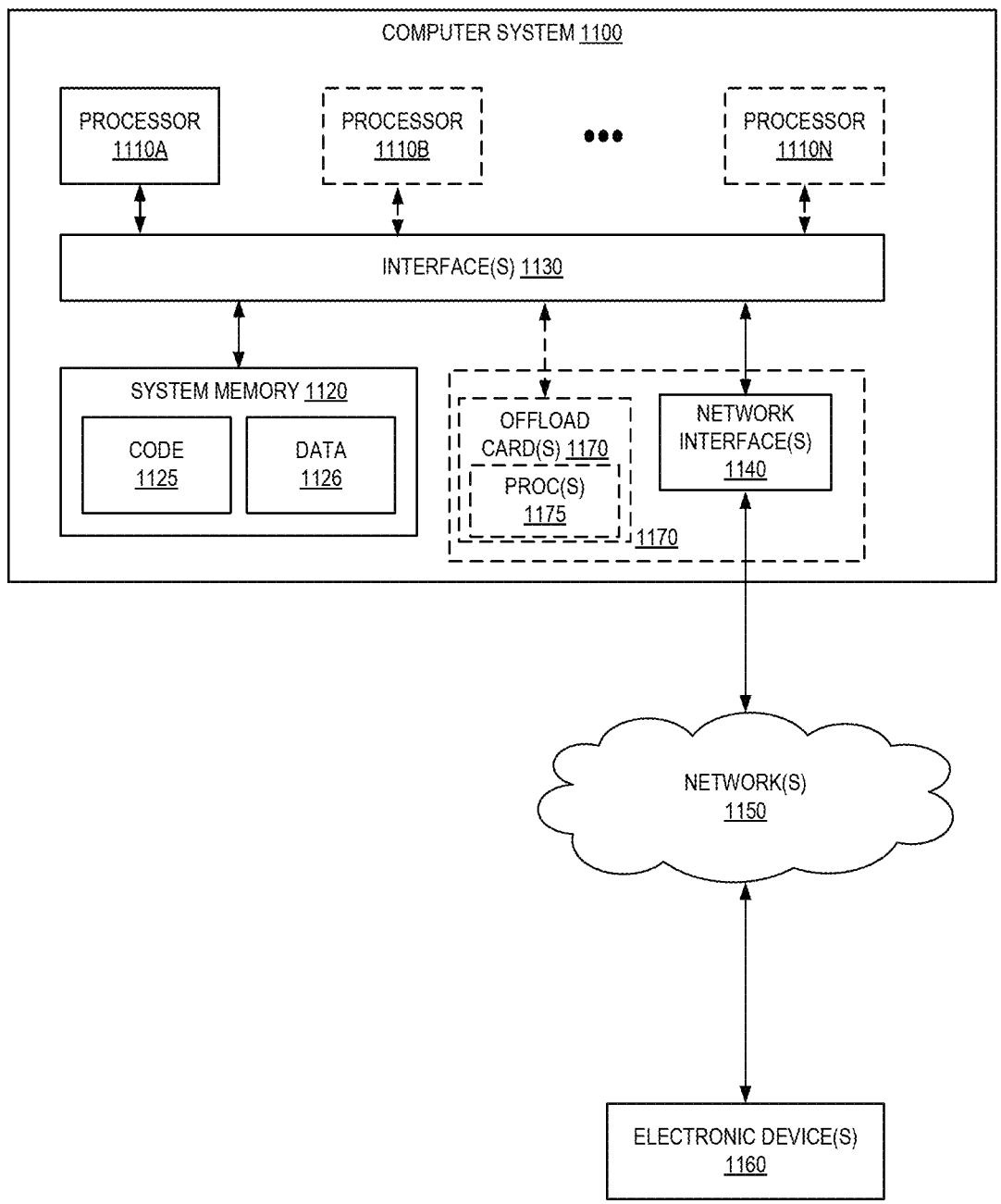
FIG. 11 is a block diagram illustrating an example computer system that may be used in some embodiments.

In some embodiments, a system that implements a portion or all of the techniques for entity and relationship detection from unstructured text as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a web service endpoint of a provider network, a request to identify entities in unstructured text, the request being originated by a client and including the unstructured text;
   identifying a plurality of segments within the unstructured text;
   identifying, for each of the plurality of segments, one or more locations of one or more tokens within the corresponding segment;
   sending, for each segment of the plurality of segments, a request to each of a plurality of services within the provider network, wherein each request includes the segment and one or more identifiers of the one or more locations of the one or more tokens, and wherein each of the plurality of services utilizes the segment and the one or more identifiers with a machine learning (ML) model trained to detect entities of a particular entity type;
   receiving a plurality of responses from the plurality of services;
   sending, for one or more segments of the plurality of segments, a request to a relationship service of the provider network to identify relationships between entities and attributes in the one or more segments, wherein the request includes or is based on data returned in at least one of the plurality of responses;
   generating a result based at least in part on the plurality of responses from the plurality of services and a response from the relationship service, the result identifying one or more entities detected within the unstructured text and wherein, for at least one entity of the one or more entities detected within the unstructured text, the result further comprises an attribute determined to be related to the entity and a trait representing an understanding about the entity; and
   sending a response to the client, the response including the result, wherein sending the response causes a computer graphical user interface to be displayed, the computer graphical user interface comprising, for at least the at least one entity of the one or more entities detected within the unstructured text, an indication of all of:
   the entity,
   an attribute determined to be related to the entity,
   a trait representing an understanding about the entity,
   a numerical score indicating a confidence that the attribute is related to the entity, and
   a numerical score indicating a confidence that the trait represents a correct understanding about the entity.

2. The computer-implemented method of claim 1, wherein the one or more entities detected within the unstructured text is a plurality of entities detected within the unstructured text; and wherein the plurality of entities includes two or more of:
   a medication;
   a medical condition;
   personal health information;
   a test, treatment, or procedure; or
   an anatomical body part or system.

3. A computer-implemented method comprising:
   receiving a request to identify entities in unstructured text;
   identifying a plurality of segments within the unstructured text;

executing, for each segment of the plurality of segments, a plurality of machine learning (ML) models trained to detect entities of a particular entity type to yield a plurality of outputs;

executing, for one or more segments of the plurality of segments, a machine learning model to identify relationships between entities and attributes in the one or more segments to yield an output, wherein an input to the machine learning model includes or is based on data of at least one of the plurality of outputs;

generating a result based at least in part on the plurality of outputs and the output of the machine learning model for identifying relationships between entities and attributes, the result identifying one or more entities detected within the unstructured text and wherein, for at least one entity of the one or more entities detected within the unstructured text, the result further comprises an attribute determined to be related to the entity and a trait representing an understanding about the entity; and transmitting the result thereby causing a computer graphical user interface to be displayed, the computer graphical user interface comprising, for at least the at least one entity of the one or more entities detected within the unstructured text, an indication of all of:
the entity,
an attribute determined to be related to the entity,
a trait representing an understanding about the entity,
a numerical score indicating a confidence that the attribute is related to the entity, and
a numerical score indicating a confidence that the trait represents a correct understanding about the entity.

4. The computer-implemented method of claim 3, further comprising:

identifying, for each of the plurality of segments, one or more locations of one or more tokens within the corresponding segment, wherein each of the plurality of ML models, for each segment of the plurality of segments, utilizes the segment and the one or more locations of tokens detected within the segment.

5. The computer-implemented method of claim 3, wherein the machine learning model for identifying relationships between entities and attributes comprises a convolutional neural network (CNN) model.

6. The computer-implemented method of claim 3, wherein each of the plurality of ML models comprises a Recurrent Neural Network (RNN) model.

7. The computer-implemented method of claim 3, wherein each of the plurality of ML models is executed by a separate one or more virtual machines or containers within a provider network.

8. The computer-implemented method of claim 3, further comprising:

obtaining a plurality of model version identifiers corresponding to software release versions of the plurality of ML models; and generating a model version token based at least in part on the plurality of model version identifiers, wherein the result further comprises the model version token.

9. The computer-implemented method of claim 3, wherein the plurality of ML models are implemented within a single container or a single virtual machine.

10. The computer-implemented method of claim 3, wherein:

the request was originated by a client and indicates that the result is to be generated and returned to the client synchronously via a same network connection; and transmitting the result occurs via the same network connection.

11. The computer-implemented method of claim 3, wherein:

the request was originated by a client and identifies at least one of a first storage location where the unstructured text is stored or a second storage location where the result is to be stored; and the unstructured text comprises a plurality of unstructured text elements to be analyzed in a batch.

12. The computer-implemented method of claim 3, wherein the one or more entities detected within the unstructured text is a plurality of entities detected within the unstructured text; and wherein the plurality of entities includes two or more of:

a medication;
a medical condition;
personal health information;
a test, treatment, or procedure; or
an anatomical body part or system.

13. A system comprising:

a plurality of analysis services implemented by a first one or more electronic devices, the plurality of analysis services comprising a plurality of machine learning models and a relationship service, each of the plurality of analysis services comprising at least one machine learning (ML) model of the plurality of machine learning models trained to identify medical entities, the relationship service comprising a machine learning model trained to identify relationships between entities and attributes; and an orchestrator implemented by a second one or more electronic devices, the orchestrator including instructions that upon execution cause the orchestrator to:

obtain an unstructured text;

identify a plurality of segments within the unstructured text;

send, for each of the plurality of segments, a plurality of requests to the plurality of analysis services to detect medical entities to yield a corresponding plurality of outputs;

send, for one or more segments of the plurality of segments, a request to the relationship service of to identify relationships between entities and attributes in the one or more segments to yield an output, wherein the request includes or is based on data in in at least one of the plurality of outputs;

generate a result based at least in part on the plurality of outputs and the output of the relationship service, the result identifying one or more entities detected within the unstructured text and wherein, for at least one entity of the one or more entities detected within the unstructured text, the result further comprises an attribute determined to be related to the entity and a trait representing an understanding about the entity; and transmitting the result to cause a computer graphical user interface to be displayed, the computer graphical user interface comprising, for at least the at least one entity of the one or more entities detected within the unstructured text, an indication of all of:

the entity,
an attribute determined to be related to the entity,
a trait representing an understanding about the entity, a numerical score indicating a confidence that the attribute is related to the entity, and a numerical score indicating a confidence that the trait represents a correct understanding about the entity.

14. The system of claim 13, wherein the instructions upon execution further cause the orchestrator to:
   identify, for each of the plurality of segments, one or more locations of one or more tokens within the corresponding segment,
   wherein for each segment each of the plurality of requests further includes identifiers of the one or more locations, and
   wherein each of the plurality of machine learning models is to detect entities using, as input to the ML model, the segment and the identifiers of the one or more locations.

15. The system of claim 13, wherein the machine learning model of the relationship service comprises a convolutional neural network (CNN) model.

16. The system of claim 13, wherein each of the plurality of machine learning models comprises a Recurrent Neural Network (RNN) model.

17. The system of claim 13, wherein each of the plurality of machine learning models is executed by a separate one or more virtual machines or containers.

18. The system of claim 13, wherein the plurality of machine learning models is implemented within a single container or a single virtual machine.

19. The system of claim 13, wherein the orchestrator further comprises instructions that upon execution cause the orchestrator to:
   receive a request originated by a client via a network connection, the request to identify entities in the unstructured text, the request indicating that the result is to be generated and returned to the client synchronously via a same network connection; and
   transmit the result via the network connection via which the request originated by the client is received.

20. The system of claim 13, wherein the orchestrator further comprises instructions that upon execution cause the orchestrator to:
   receive a request originated by a client, the request to identify entities in the unstructured text, the request identifying at least one of or both of:
      a first storage location where the unstructured text is stored, or
      a second storage location where the result is to be stored; and
   wherein the unstructured text comprises a plurality of unstructured text elements to be analyzed in a batch.

* * * * *